(12) United States Patent
Klochikhin et al.

(10) Patent No.: US 11,081,006 B2
(45) Date of Patent: *Aug. 3, 2021

(54) SYSTEM AND METHOD FOR HIGH ACCURACY LOCATION DETERMINATION AND PARKING

(71) Applicant: PARKOFON INC., Alexandria, VA (US)

(72) Inventors: Evgeny Klochikhin, Alexandria, VA (US); Vladimir Klochikhin, Tambov (RU); Iurii Iatsinin, Tambov (RU)

(73) Assignee: PARKOFON INC., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,084

(22) Filed: Apr. 24, 2020

(65) Prior Publication Data

US 2020/0250978 A1 Aug. 6, 2020

Related U.S. Application Data

(63) Continuation of application No. 15/965,895, filed on Apr. 28, 2018, now Pat. No. 10,636,306.

(Continued)

(51) Int. Cl.
*G01P 15/14* (2013.01)
*G01S 19/01* (2010.01)
(Continued)

(52) U.S. Cl.
CPC .............. *G08G 1/144* (2013.01); *G01P 15/14* (2013.01); *G01S 19/01* (2013.01); *G06Q 30/0284* (2013.01); *G08G 1/146* (2013.01); *G08G 1/147* (2013.01); *G08G 1/205* (2013.01); *G08G 1/207* (2013.01)

(58) Field of Classification Search
None
See application file for complete search history.

(56) References Cited

U.S. PATENT DOCUMENTS 1,535,601 A 6/1924 Graham
2,567,785 A 1/1948 Rieger
(Continued)

OTHER PUBLICATIONS

Author: ParkWhiz, Title: Find Available Parking on Your Mobile Phone, Published: Apr. 3, 2008, Pertinent Pages: Entire document (Year: 2008).*

(Continued)

*Primary Examiner* — Muhammad Adnan
(74) *Attorney, Agent, or Firm* — Resolute Legal PLLC

(57) ABSTRACT

The various systems and methods disclosed herein provide for a secure, cost effective, and high accuracy location detection. In some embodiments of the system and method for high accuracy location detection, a mobile location device obtains and calculates location data from a plurality of sources without requiring expensive and power inefficient processors. In some embodiments, such secure, cost effective, and high accuracy location detection by the mobile location device is used in improved parking and payment management systems and methods. In some such embodiments, the location device communicates with remote geomapping servers and payment systems to provide automated parking and payment.

18 Claims, 16 Drawing Sheets

Related U.S. Application Data

(60) Provisional application No. 62/492,930, filed on May 1, 2017.

(51) Int. Cl.
*G08G 1/14* (2006.01)
*G08G 1/00* (2006.01)
*G06Q 30/02* (2012.01)

(56) References Cited

U.S. PATENT DOCUMENTS

| | | | |
|---|---|---|---|
| 3,382,734 A | 5/1968 | Hussey | |
| 3,807,255 A | 4/1974 | Baginski | |
| 4,103,563 A | 8/1978 | Genzling | |
| 4,373,760 A | 2/1983 | Durham | |
| 4,882,946 A | 11/1989 | Beyl | |
| 4,893,523 A | 1/1990 | Lennon | |
| 4,898,048 A | 2/1990 | Sampson | |
| 4,936,164 A | 6/1990 | Forke | |
| 4,969,373 A | 11/1990 | Good | |
| 5,490,073 A | 2/1996 | Kyrtsos | |
| 5,549,396 A | 8/1996 | Chiang | |
| 5,727,429 A | 3/1998 | Ueda | |
| 5,755,144 A | 5/1998 | Ueda | |
| 5,992,266 A | 11/1999 | Heim | |
| 6,081,206 A * | 6/2000 | Kielland | G06Q 30/0284 194/902 |
| 6,081,230 A * | 6/2000 | Hoshino | G01C 21/165 342/357.32 |
| 6,114,990 A * | 9/2000 | Bergljung | F41G 3/26 342/357.31 |
| 6,205,885 B1 | 3/2001 | Hermansen et al. | |
| 6,282,984 B1 | 9/2001 | Chen | |
| 6,393,940 B1 | 5/2002 | Ueda | |
| 6,493,676 B1 * | 12/2002 | Levy | G06Q 30/0284 705/13 |
| 6,543,309 B2 | 4/2003 | Heim | |
| 6,647,826 B2 | 11/2003 | Okajima et al. | |
| 6,925,908 B2 | 8/2005 | Muraoka | |
| 7,174,807 B2 | 2/2007 | Bryne | |
| 7,188,070 B2 * | 3/2007 | Dar | G06Q 20/127 705/13 |
| 7,215,255 B2 * | 5/2007 | Grush | G06Q 30/0284 340/932.2 |
| 8,063,797 B1 * | 11/2011 | Sonnabend | G08G 1/04 340/932.2 |
| 8,065,179 B1 * | 11/2011 | Karnik | G06Q 10/107 705/7.35 |
| 8,131,596 B2 * | 3/2012 | McQuilken | G06Q 30/0284 705/26.1 |
| 8,140,265 B2 * | 3/2012 | Grush | G06Q 20/127 701/468 |
| 8,175,886 B2 * | 5/2012 | Odinak | G10L 15/26 704/270.1 |
| 8,250,366 B2 * | 8/2012 | Longobardi | H04L 9/3268 713/168 |
| 9,123,034 B2 | 9/2015 | Rydbeck et al. | |
| 9,135,821 B2 * | 9/2015 | Levy | H04W 4/027 |
| 9,418,550 B2 * | 8/2016 | Geelen | G01C 21/3685 |
| 9,558,665 B2 * | 1/2017 | Wang | G08G 1/017 |
| 9,924,320 B1 * | 3/2018 | Rajagopal | H04W 4/023 |
| 9,971,998 B2 * | 5/2018 | Nuzzi | G06Q 20/102 |
| 10,192,440 B2 * | 1/2019 | Hohenacker | G06K 9/325 |
| 10,275,948 B2 * | 4/2019 | Wang | G08G 1/146 |
| 10,395,535 B2 * | 8/2019 | Wang | G06Q 20/0855 |
| 2002/0008639 A1 * | 1/2002 | Dee | G07B 15/02 340/932.2 |
| 2003/0146852 A1 * | 8/2003 | O'Dell | G07B 15/02 340/932.2 |
| 2004/0057540 A1 * | 3/2004 | Naberfeld | H04H 20/22 375/354 |
| 2005/0252337 A1 | 11/2005 | Chen | |
| 2005/0286421 A1 * | 12/2005 | Janacek | H04W 4/029 370/231 |
| 2006/0238415 A1 * | 10/2006 | Gilkes | G01S 19/235 342/357.64 |
| 2007/0016362 A1 * | 1/2007 | Nelson | G01C 21/362 701/425 |
| 2009/0030605 A1 * | 1/2009 | Breed | G08G 1/167 701/532 |
| 2009/0241725 A1 | 10/2009 | Chen | |
| 2009/0248577 A1 * | 10/2009 | Hoj | G06Q 20/102 705/40 |
| 2009/0292597 A1 * | 11/2009 | Schwartz | G07F 17/0014 705/13 |
| 2010/0064845 A1 | 3/2010 | French | |
| 2011/0153367 A1 * | 6/2011 | Amigo | G07C 5/008 705/4 |
| 2012/0130777 A1 * | 5/2012 | Kaufman | H04W 4/48 705/13 |
| 2012/0265434 A1 * | 10/2012 | Woodard | G08G 1/147 701/423 |
| 2013/0282448 A1 * | 10/2013 | Rydbeck | G06Q 20/145 705/13 |
| 2014/0040028 A1 * | 2/2014 | King | G06Q 30/0261 705/14.53 |
| 2014/0379442 A1 * | 12/2014 | Dutta | G06Q 20/3278 705/13 |
| 2015/0087264 A1 * | 3/2015 | Goyal | G01S 19/34 455/411 |
| 2015/0170031 A1 * | 6/2015 | Attar | G08G 1/205 706/46 |
| 2015/0317840 A1 * | 11/2015 | Dutta | G06Q 20/145 705/13 |
| 2016/0012726 A1 * | 1/2016 | Wang | G07B 15/02 340/932.2 |
| 2016/0125736 A1 * | 5/2016 | Shaik | G08G 1/14 701/23 |
| 2016/0284137 A1 * | 9/2016 | Levy | G06Q 20/32 |
| 2017/0074659 A1 * | 3/2017 | Giurgiu | G01S 19/071 |
| 2017/0318149 A1 * | 11/2017 | Daoud | H04W 4/90 |
| 2017/0358208 A1 * | 12/2017 | Kazemi | H04W 4/44 |
| 2018/0194344 A1 * | 7/2018 | Wang | G05D 1/0257 |

OTHER PUBLICATIONS

International Search Report and Written Opinion dated Jul. 26, 2018, International Application No. PCT/US18/30062, pp. 1-10.
International Preliminary Search Report on Patentability dated Nov. 14, 2019, International Application No. PCT/US18/30062, pp. 1-10.
Allison Kealy et al., "MEMS and wireless options: User localization in cellular phones", ION Pacific PNT Conference, May 2017, pp. 1-8.
Gerard Lachapelle, "GNSS Indoor Location Technologies", The 2004 International Symposium on GNSS/GPS, Dec. 2004, pp. 1-15.
Sameh Nassar et al., "Improving MEMS IMU/GPS Systems for Accurate Land-Based Navigation Applications", ION NTM 2006, January 2206, pp. 1-7.
Parkwhiz, "Find Available Parking on Your Mobile Phone", Retrieved from the Internet Apr. 3, 2008: http://www.parking-net.com/parking-news/find-available-parking-on-your-mobile-phone, pp. 1-3.

* cited by examiner

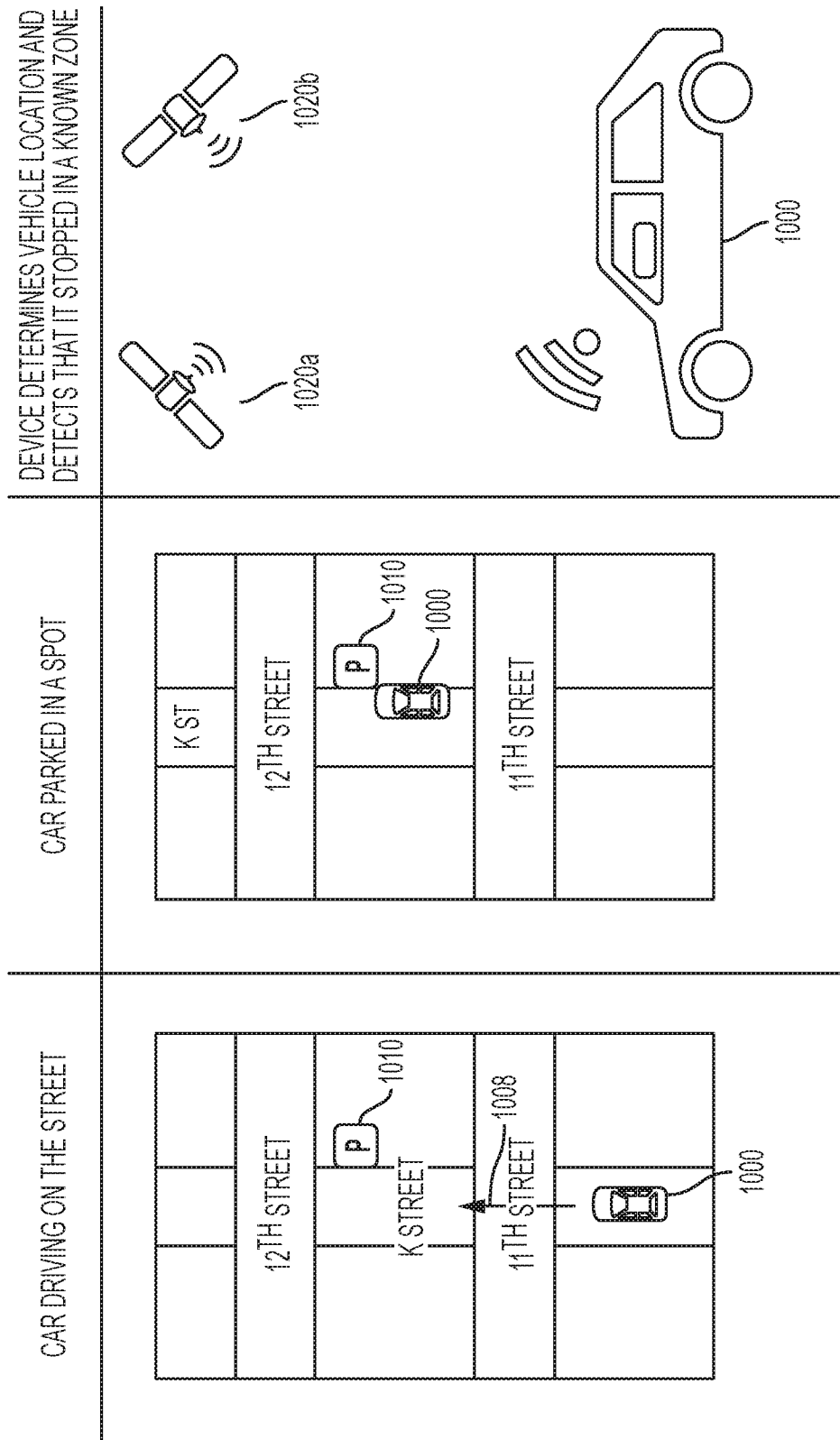

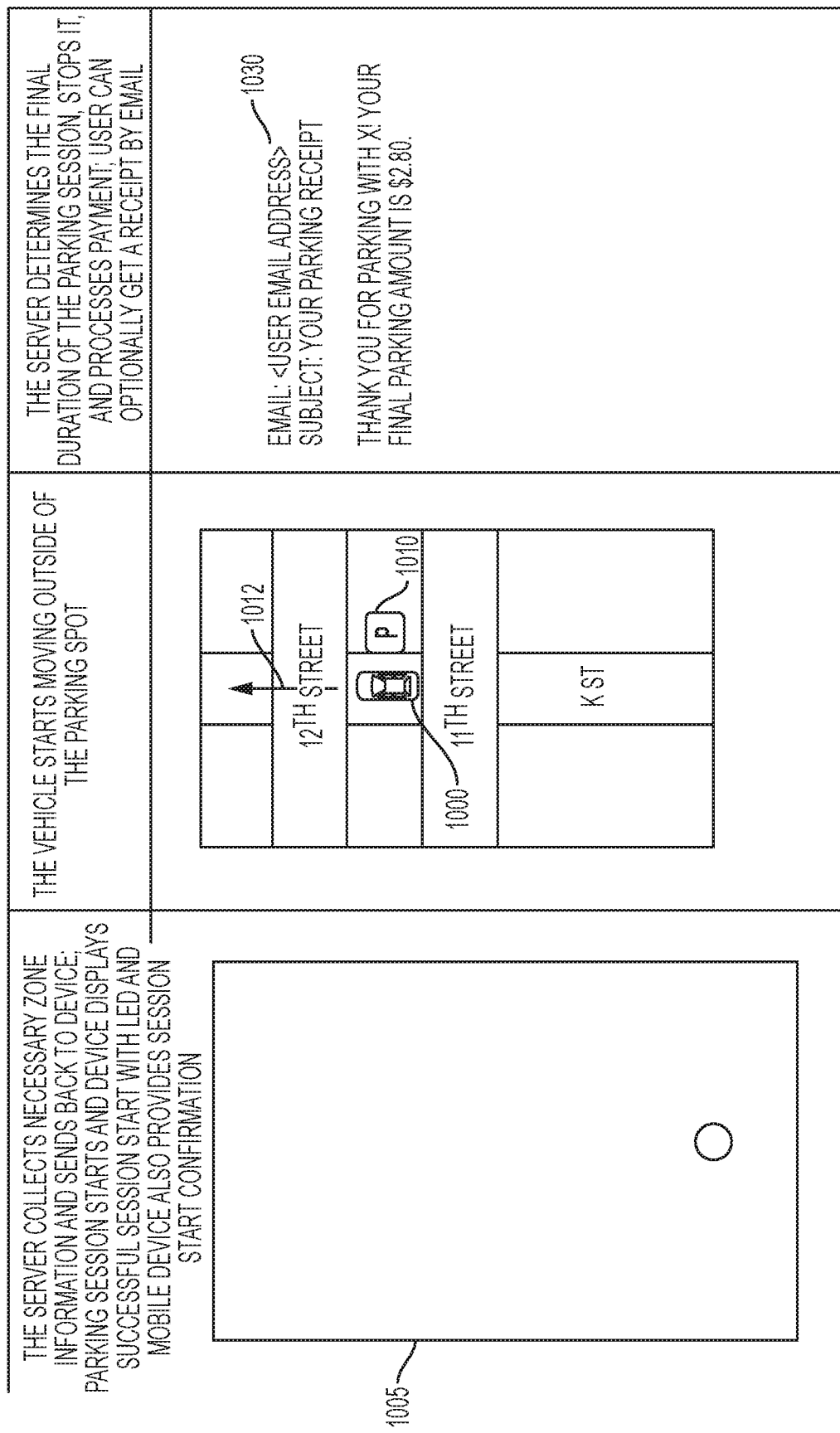

SYSTEM AND METHOD FOR HIGH ACCURACY LOCATION DETERMINATION AND PARKING

CROSS REFERENCE TO RELATED APPLICATION

This application is a continuation of U.S. application Ser. No. 15/965,895, filed on Apr. 28, 2018, which claims priority to U.S. Provisional Application No. 62/492,930, filed on May 1, 2017, both contents of which are hereby incorporated by reference.

FIELD OF THE INVENTION

The present disclosure relates to the fields of high accuracy location determination, cashless parking, wireless payment for parking, remote management and control of parking, and intelligent transportation systems more generally.

SUMMARY OF THE INVENTION

The various systems and methods disclosed herein provide for a secure, cost effective, efficient, and high accuracy location detection. In some embodiments of the system and method for high accuracy location detection, a mobile location device obtains and calculates accurate location data from a plurality of sources such as global navigation satellite systems (GNSS), microelectromechanical systems (MEMS), and geographic information systems (GIS) without requiring expensive and power inefficient processors to read raw GNSS data.

In some embodiments, such secure, cost effective, and high accuracy location detection by the location device can be applied for use in improved parking and payment management systems and methods. In some such embodiments, the location device further communicates with remote geomapping servers and payment systems to provide automated parking and payment.

In one embodiment for improved parking and payment management, the location device can be placed in a user's vehicle. In one embodiment, when the location device detects that the vehicle is stopped, the location device begins an automated process to determine if the vehicle is in a legal parking zone. The location device initiates the automated process by capturing location data from a plurality of different sources. For example, the location device includes an antenna and processor for obtaining GNSS data from at least one or a plurality of satellites. The location device may include a MEMS inertial measurement unit processor with sensors such as accelerometers, gyroscopes, and magnetometers to measure force, angular rate, and the magnetic field applied to the location device. The location device may also be in communication with GIS servers to obtain mapping data. The location device may capture a predetermined amount of data points from each of the plurality of sources of location data over a predetermined amount of time. The location device synchronizes the location data obtained from the plurality of different sources and calculates a final set of coordinates that provide, with a high degree of accuracy, the coordinates of the location device. The location device transmits these coordinates to a geomapping server to determine whether the user's vehicle (holding the location device) is in a legal parking zone. If the vehicle is in a legal parking zone, the geomapping server transmits a message to the location device indicating that a parking session can be started. The location device may then initiate a parking session with the geomapping server. The geomapping server may interact with the location device and a mobile device of the user to confirm the start of the parking session.

Once a user's parking needs are satisfied, the parking session may be ended in a number of ways. In one embodiment, when the location device detects the vehicle moving, the location device sends a message to the geomapping server to end the parking session. In one embodiment, the parking session terminates after a predetermined period of time. In another embodiment, the user may send a message from the mobile device or the location device to the geomapping server to terminate the parking session. At the conclusion of the parking session, the geomapping server may communicate with a payment processing server to charge the user for the parking session in one embodiment. The geomapping server may send a confirmation message to the location device and the user's mobile device confirming the termination of the parking session. In some embodiments, the message confirming the termination of the parking session may include information detailing the charge for the parking session. It should be appreciated that in some embodiments, the user may prepay for a parking session and information detailing the charge for the parking session may be unnecessary.

It should be appreciated that the high accuracy location detection combined with the novel parking management system enables an automated parking session that frees users from carrying appropriate types of money necessary to pay for parking and from leaving their vehicles to spend time paying for parking. The automated parking sessions also enable users to determine that they are in a legal parking spot without concern about risking a parking fine for illegal parking. As the high accuracy location detection combined with the novel parking management system becomes widely adopted, the parking management system will also enable users to determine where and when parking spaces become available in real or near real time.

In alternative embodiments, the secure, cost effective, and high accuracy location detection system and method may be used with a number of other different systems that require high accuracy location detection. For example, the location device can be installed in corporate vehicle fleets to collect and provide accurate data for managing the vehicle fleets in one embodiment. In an alternative embodiment, the location device can interact with toll pass systems to provide toll payments and reduce the quantity of devices a user must maintain in a vehicle. In another embodiment, the location device and the high accuracy location detection system may track a variety of different data points about a vehicle's use for insurance data analytics. The above list of uses for the high accuracy location detection system and method are merely examples and other suitable uses are contemplated.

BRIEF DESCRIPTION OF THE DRAWINGS

FIGS. 10A, 10B, 10C, 10D, 10E, and 10F are illustrations of an example embodiment of starting a parking session for a vehicle in a legal parking zone and then stopping the parking session when the vehicle leaves the parking zone.

DETAILED DESCRIPTION OF THE INVENTION

The disclosure herein provides various embodiments of secure, cost effective, efficient, and high accuracy location detection systems from which those skilled in the art shall appreciate various novel approaches and features developed by the inventors. These various novel approaches and features, as they may appear herein, may be used individually, or in combination with each other, as desired.

In particular, the embodiments described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may implement such feature, structure, or characteristic in connection with other embodiments whether or not explicitly described.

Figure 1:
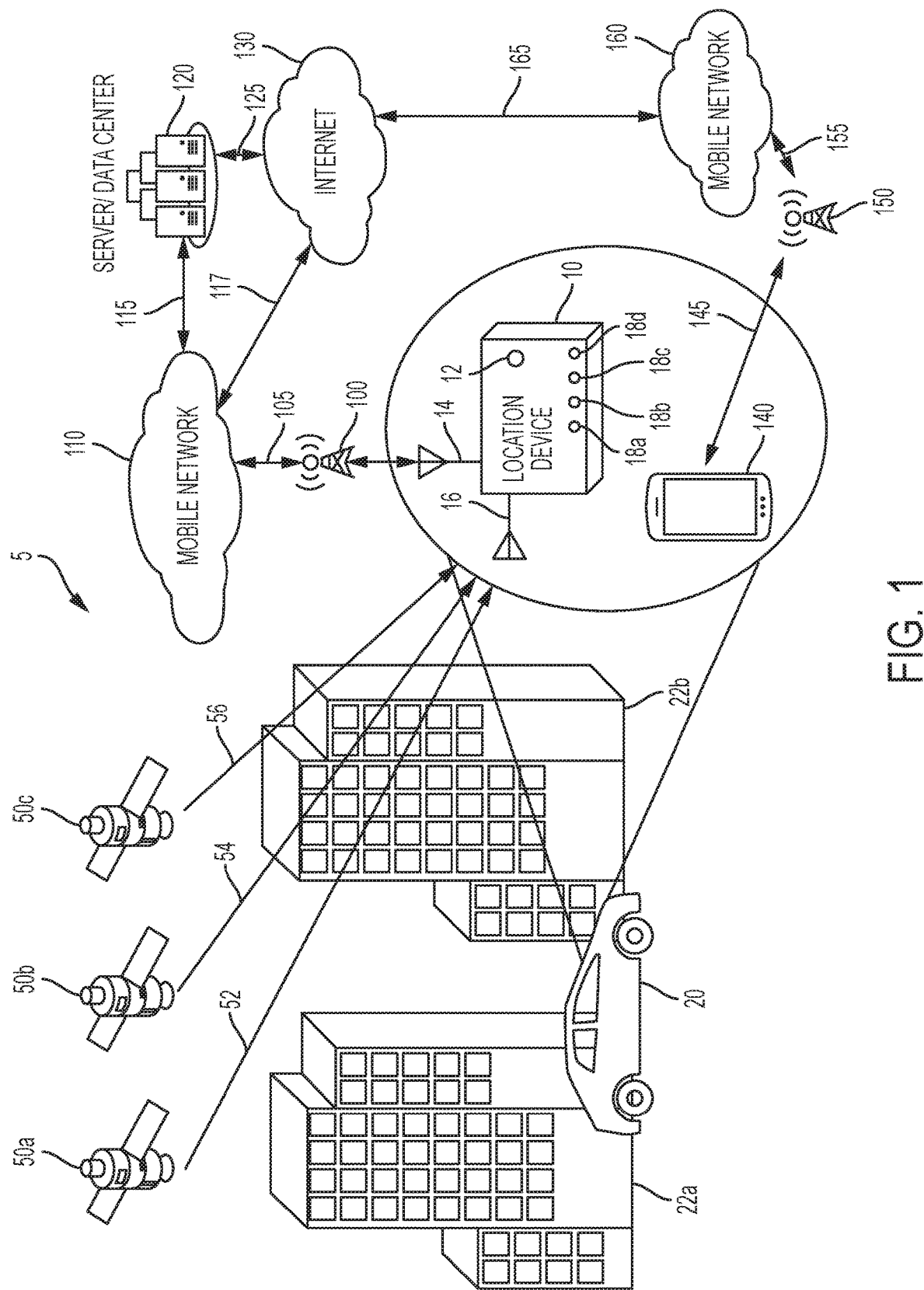
FIG. 1 is a perspective view of one embodiment of a vehicle having a location device that is in communication with numerous different systems to determine the location of the vehicle with a high degree of accuracy.

FIG. 1 is a perspective view of a location system 5 that provides low cost, high accuracy location detection. The location system 5 includes a location device 10 that is mobile. In some embodiments, location device 10 is a specially configured device comprising a plurality of low cost location processors that can help calculate a location of the location device 10 within a few meters of accuracy within a geographic area. In some embodiments, the location accuracy is within four meters or less of accuracy. However, other suitable levels of accuracy may be achieved. The location device 10 can help calculate a location using one or more sources of location data. The location device 10 may comprise at least one indicator light 12, a plurality of user interface buttons 18a-18b, and antennas 14 and 16. In some embodiments, the antennas are not visible and are contained within the location device 10. It should be appreciated that the location device 10 may comprise more indicator lights or no indicator lights; fewer or more user interface buttons; and fewer or more antennas. Location device 10 may include a user interface screen (not shown) in some embodiments. Location device 10 may include other features as discussed below. Location device 10 may be placed in a vehicle 20. The location device 10 is configured to work in a variety of different locations, including "urban canyons" created when location device and vehicle 20 pass through cities and are surrounded by buildings such as building 22a and 22b. These "urban canyons" create multipath signal distortions that previously made it difficult to resolve locations of GPS units absent extremely expensive hardware solutions that require excessive amounts of power.

Location device 10, as shown in FIG. 1, is in communication with a plurality of different devices and systems to aid in detecting the location (i.e., geographic position) of location device 10. In one embodiment, location device 10 is in communication with a plurality of different satellite systems, such as satellite system 50a, satellite system 50b, and satellite system 50c. Location device 10 may receive location signal 52 from satellite system 50a; location signal 54 from satellite system 50b; and location signal 56 from satellite system 50c through antenna 16. Satellite system 50a may comprise a global positioning system (GPS) satellite system, which comprises a plurality of satellites. Satellite system 50b may comprise a Global Orbiting Navigation Satellite System (GLONASS), which comprises a plurality of satellites. Satellite system 50c may comprise a Galileo satellite system, which comprises a plurality of satellites. It should be appreciated that in some embodiments, location device 10 may receive signals from fewer satellite systems (e.g., satellite system 50a, but not other satellite systems 50b and 50c). In other embodiments, location device 10 may receive signals from more satellite systems than illustrated. In some embodiments, where location device 10 is unable to receive satellite signals, location device 10 may not receive signals from any satellite.

Location device 10 may communicate through antenna 14 with a mobile network 110 through one or more cellular access points 100. Cellular access points 100 may communicate with the mobile network 110 via communication link 105. It should be appreciated that mobile network 110 may include hundreds or thousands of cellular access points 100 and communication links 105 to provide access to the mobile network 110. Through the mobile network 110, location device 10 may communicate via communication link 115 with one or more servers and databases in data center 120. Such servers may be described as geomapping servers herein. In some embodiments, system 5 may include a plurality of different data centers spread throughout a particular country or throughout the world to ensure that location device 10 has access to smooth and low latency communication to location services provided by servers in data center 120. In one embodiment, mobile network 110 provides a secure connection between location device 10 and servers in data center 120. In one embodiment, the secure connection can be a virtual private network (VPN). However, other suitable secure connections can be used for location device 10 to communicate with the servers in data center 120. In some embodiments, the communications between location device 10 and servers in data center 120 are not secure. It should be appreciated that in some embodiments, location device 10 may also access other servers or endpoints that are in communication with mobile network 110. In some embodiments, the system 5 may include a plurality of different mobile networks 110. In some embodiments, the plurality of different mobile networks are located in different countries. In other embodiments, some of the plurality of different mobile networks are located in the same country. In some embodiments, mobile network 110 is a mobile virtual network (MVN). The mobile network 110 may be created as a virtual network that communicates over one or more other mobile networks. For example, the mobile network 110 may be formed using connectivity over a first GSM based mobile network and a second different GSM based mobile network. When a mobile device 10 moves between a first GSM based mobile network and a second different GSM based mobile network, the transition and the data transmitted over the two different GSM based mobile networks is seamlessly routed to the same place, creating a virtual mobile network.

Location device 10 may communicate through mobile network 110 with the Internet 130. Mobile network 110 may have one or more links to the Internet 130, which permit location device 10 to communicate with endpoints on the Internet 130. In some embodiments, location device 10 may access services from endpoints on the Internet 130 (not shown). For example, location device 10 may access GPS correction data from a server accessible through the Internet 130. Location device 10 may access other suitable services through Internet 130. In some embodiments, servers in data center 120 may also communicate with endpoints through Internet 130 via communication links 125.

Location system 5 also illustrates a user mobile device 140. Mobile device 140 may be a mobile phone or other suitable computer system. In some embodiments, a desktop or laptop computer may be used in the same manner as mobile device 140. The mobile device 140 is associated with the location device 10. The servers in data center 120 store the association between the mobile device 140 and the location device 10. The user mobile device 140 may be in communication with one or more servers in data center 120 to access certain services. In one embodiment, mobile device 140 may be configured with an application to access information about location device 10 and parking services. Mobile device 140 may communicate with a mobile network 160 through one or more cellular access points 150 via communication link 145. Cellular access points 150 may communicate with the mobile network 160 via one or more communication links 155. It should be appreciated that mobile network 160 may include hundreds or thousands of cellular access points 150 and communication links 145 to provide access to the mobile network 110. Through the mobile network 160, the mobile device 140 may communicate via communication link 165 with one or more servers in data center 120. As noted above, a plurality of different data centers 120 may be used to provide services to mobile device 140. In some embodiments, the mobile network 160 and mobile network 110 can be the same mobile network, depending on the geographic location of the location device 10 and the mobile device 140.

While not shown, location device 10 may also directly communicate with mobile device 140. In some embodiments, the communication may occur over a short range wireless link such as Bluetooth or via hardwired links such as universal serial bus (USB) or Ethernet.

In various embodiments, communication links noted herein can comprise hardwire or wireless communication links. It should be appreciated that not all communication links and network nodes used to form the illustrated communication links are shown in FIG. 1 or other figures.

It should be appreciated that methods of communications of system 5 are not limited to the various systems and networks shown in FIG. 1. Location device 10 may be communication with any other suitable number of networks and through any other suitable communication links.

Figure 2A:
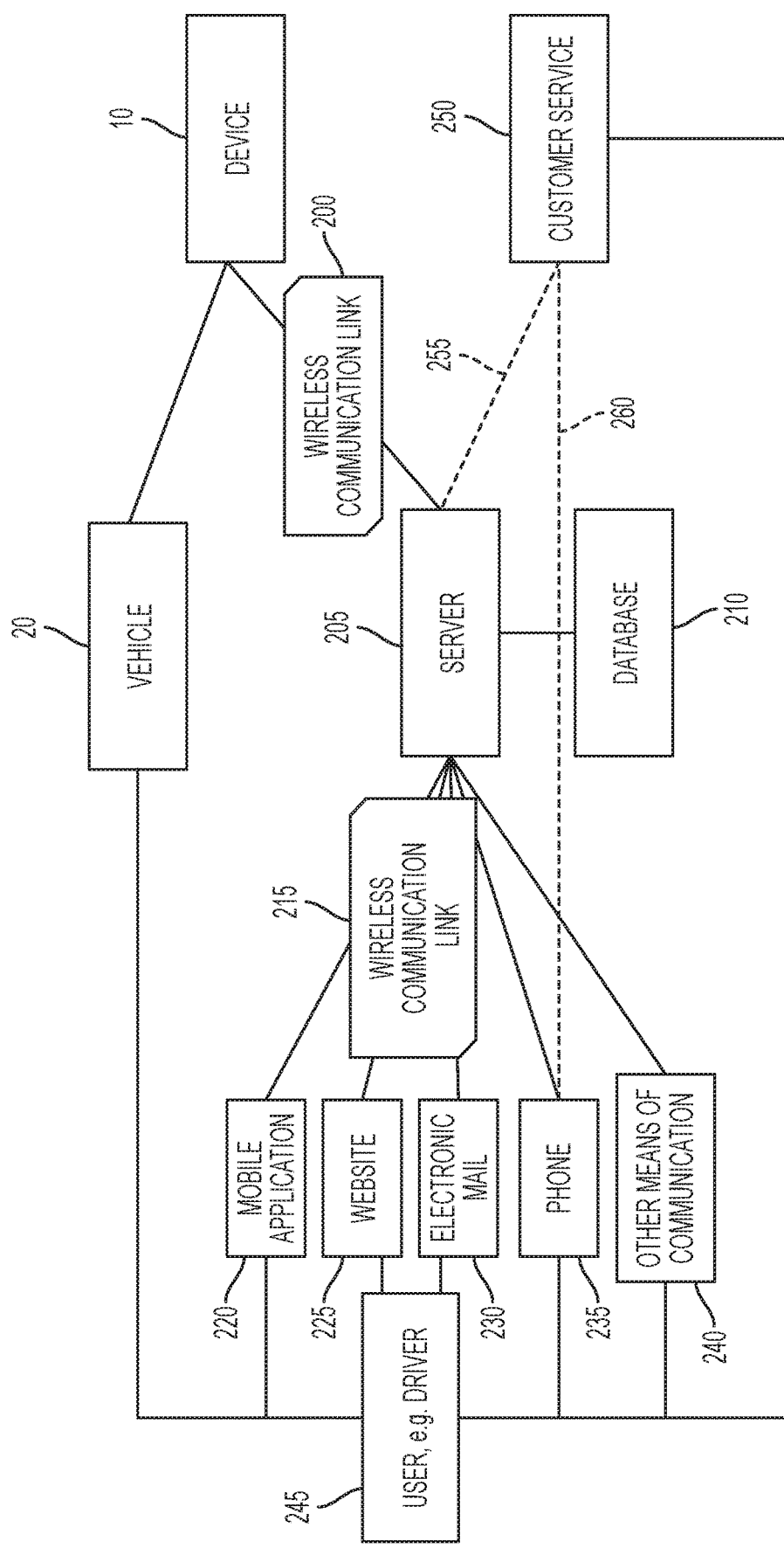
FIG. 2A is a block schematic diagram of the disclosed system and communication patterns between its different elements, including the device, the server (or multiple servers), the database (or multiple databases), and the user (through a mobile application or other means of communication, possibly including the vehicle display screen) in one embodiment.

FIG. 2A is a block schematic diagram illustrating one embodiment of the high accuracy location system for parking and possible links between its elements. The user 245, e.g. an individual driver or a company managing a corporate fleet, uses a vehicle 20 (or vehicles), which may be owned, rented, or used for employment and business operations. The location device 10 is placed in the vehicle 20. A database 210 may store geographical coordinates of legal parking zones. In some embodiments, the database 210 can be stored on an external memory device, such as SD memory card, or directly in the internal memory of the processing device, such as flash memory within location device 10. The database preferably contains information defining legal parking zones in terms of geolocated polygons. In an alternative embodiment, the parking zones can be defined as the center and radius of a circle. The data in database 210 can be derived from open data sources distributed by municipalities or from traditional surveying, for example, using methods such as those described in U.S. Pat. No. 7,215,255, which is hereby incorporated by reference.

In one embodiment, the server 205 is a computer, either a physical machine or a virtual cloud or several machines or virtual instances united together that may be housed in a data center such as data center 120 from FIG. 1. A communication link 200 is provided between the server and other components of the system: the location device 10, database 210, and the user 245 in one embodiment. The communication link 200 may be a wireless communication link, a hardware communication link, or a combination of both types of communications. In the illustration of FIG. 2A, the location device 10 communicates to the server 205 when the vehicle 20 arrives in a legal parking zone. The server 205 then connects to the database 210 to retrieve relevant information about the legal parking zone, the user, their vehicle, and their parking history. Retrieval of parking history and real time parking information can be used to prevent multiple vehicles from attempting to park in the same legal parking zone. Retrieval of parking history and real time parking information can also be used to prevent the same vehicle from attempting to park in the same legal parking zone beyond the time limit allowed by law. For example, a user may park in a given legal parking zone A for two hours and reach the time limit for that zone. If the user 245 then moves the vehicle to the next parking spot within the same zone A, the server 205 may be configured to recognize that the user 245 already used the full time limit for zone A and cannot immediately park in this zone A again for some predetermined period of time.

In one embodiment, after the server 205 establishes that the user can legally park in the identified legal parking zone, the server 205 communicates to the location device 10 the information about the hourly limit in this zone. The server 205 may receive a confirmation message from the location device 10 if the session has started successfully, and the server 205 may then communicate information about the parking session to the user 245, in this embodiment.

Figure 13C:
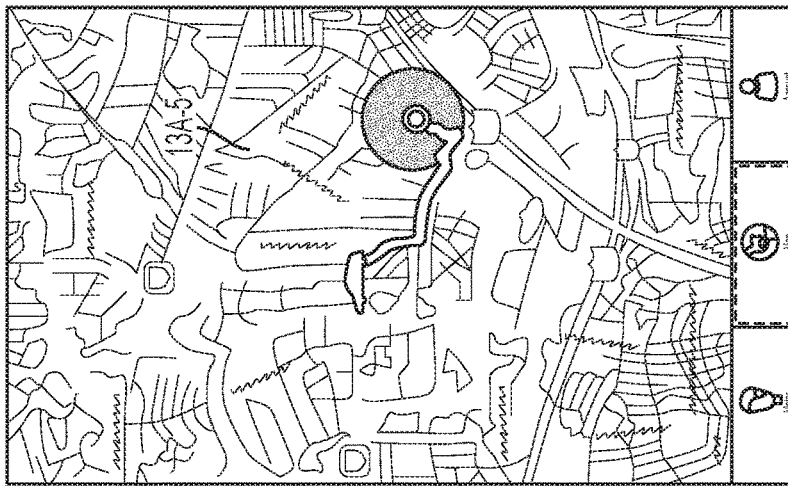
FIGS. 13A, 13B, and 13C illustrate example embodiments of screen shots of a mobile application corresponding to various states of the system (current active session, no active session, and locating a vehicle).
Figure 13B:
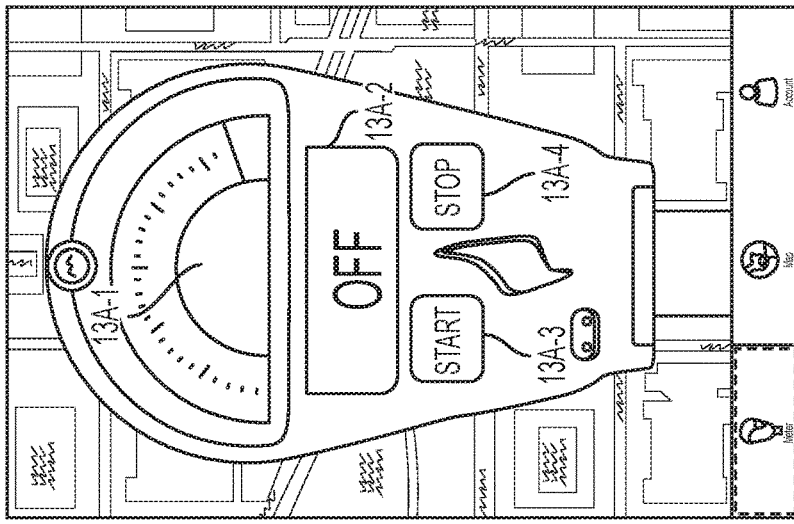
Figure 13A:
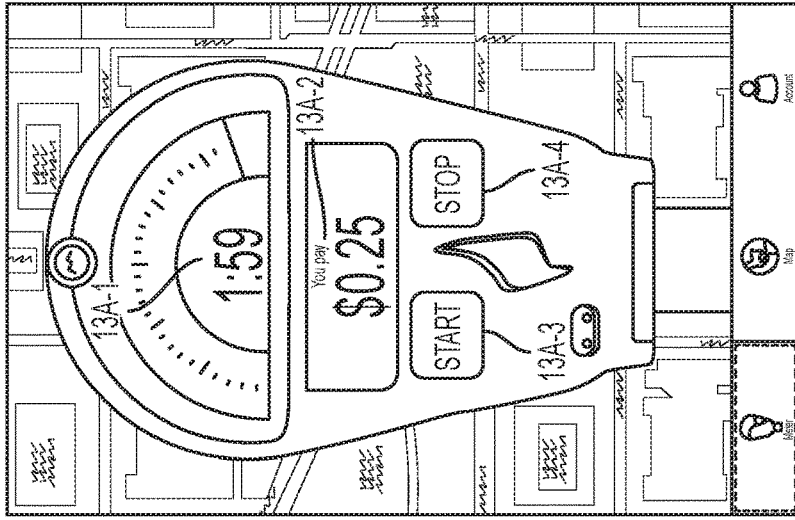

In one embodiment, a user 245 can install a mobile application 220 on their smartphone, tablet, or other portable wireless data-capable device, as is illustrated in FIGS. 13A-13C. The user 245 can configure a parking management account associated with the user 245 to selectively enable receipt of parking reminders through the mobile application 220 or other notification mechanisms via communication links 215. As noted above with other communication links, communications link 215 may be a wireless communication link, a hardware communication link, or a combination of both types of communications. In one embodiment, the notification mechanisms may include notifications through electronic mail 230, a website 225, short message service (SMS) text 235, other means of communication 240, or some combination of the above. An entity managing the parking system can provide a customer service function 250 that can be contacted via phone over link 260 or through link 255 via a software application to ask questions, resolve operational issues, and control the parking system. It should therefore be appreciated that in some embodiments, the user 245 is able to customize the activation of their parking sessions and communication settings.

Figure 2B:
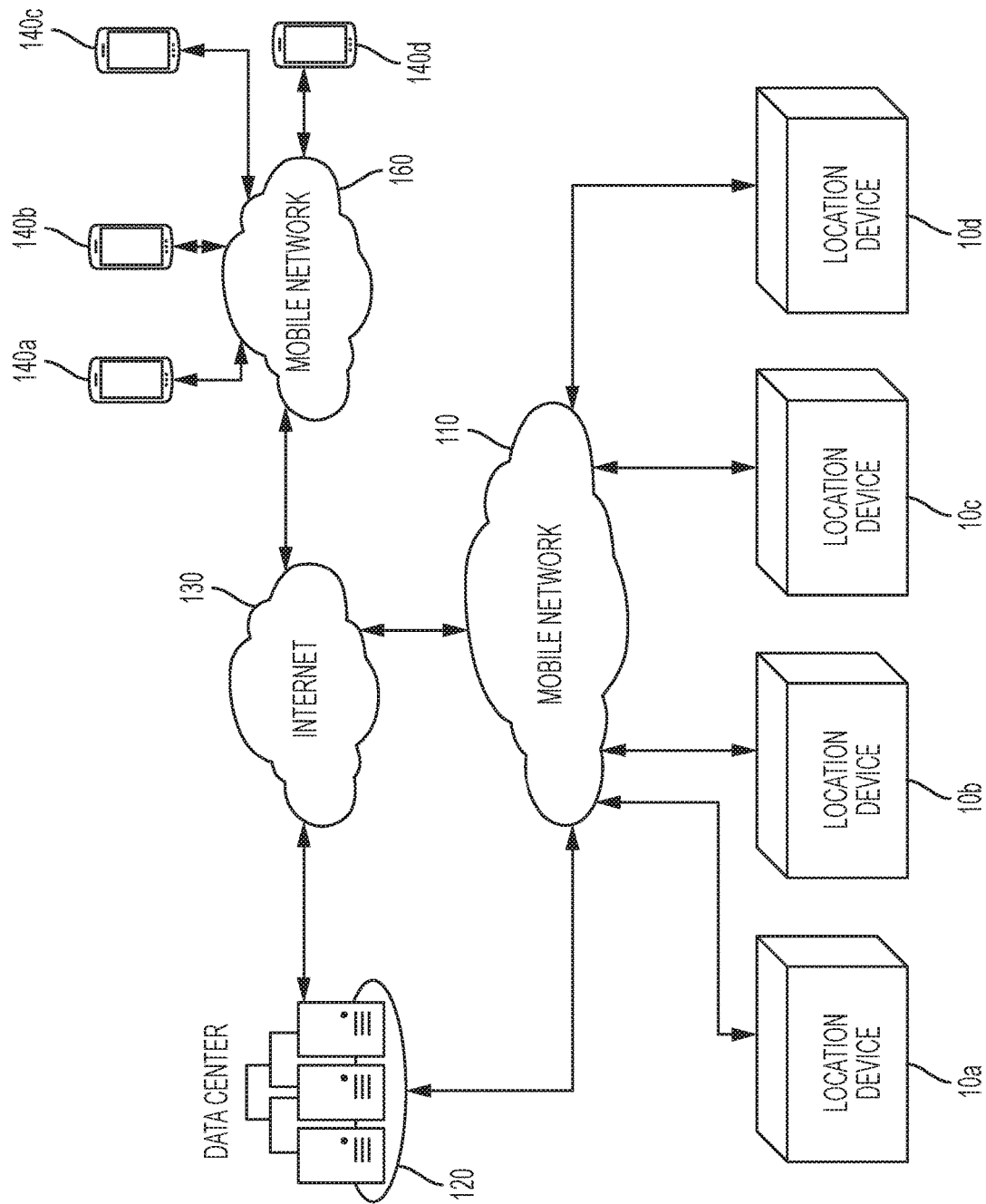
FIG. 2B is a block diagram of one embodiment of the various systems and methods further illustrating a plurality of location devices and a plurality of mobile devices.

FIG. 2B is a block diagram of one embodiment of the various systems and methods further illustrating a plurality of location devices and a plurality of mobile devices. The system elements of the mobile network 110, the data center 120, Internet 130, and the mobile network 160 and the lines or links of communication between them are the same or similar to the system elements discussed above in FIG. 1. FIG. 2B further illustrates a plurality of location devices, such as location device 10a, location device 10b, location device 10c, and location device 10d operating within the system. These location devices 10a-10d are each the same or similar to the location device 10 described above. It should be appreciated that the system illustrated in FIG. 2B may support any suitable number of additional location devices 10a-10d. In some embodiments, a higher saturation of location devices in any given geographic region provides better information to the servers in data center 120. This in turn, enables the servers in data center 120 to provide better information to the location devices and elements in the system (e.g., location devices 10a-10d and mobile devices 140a-140d). In some embodiments having a plurality of different mobile networks 110, at least one of the location devices 10a-10d may be in communication with one of the different mobile networks. For example, location device 10a may be located in the United States and in communication with a mobile network 110 located in the United States. Whereas, location device 10d may be located in the United Kingdom and may be in communication with a different mobile network.

FIG. 2B further illustrates mobile device 140a, mobile device 140b, mobile device 140c, and mobile device 140d. These mobile devices 140a-140d are each the same or similar to the mobile device 140 described above. It should be appreciated that the system illustrated in FIG. 2B may support any suitable number of additional mobile devices 140a-140d. Like mobile device 140, each mobile device 140a-140d is associated with at least one of the location devices 10a-10d. In some embodiments, mobile device 140 may be associated with more than one location device 140a-140d. As noted above, these associations can be stored in a server or database in data center 120. For example, if mobile device 140a belongs to user A who has two cars, user A may place a location device 10a in one car and a location device 10b in the other car. Thus, the system may associate location device 10a and location device 10b with user A's mobile device 140a.

Figure 3:
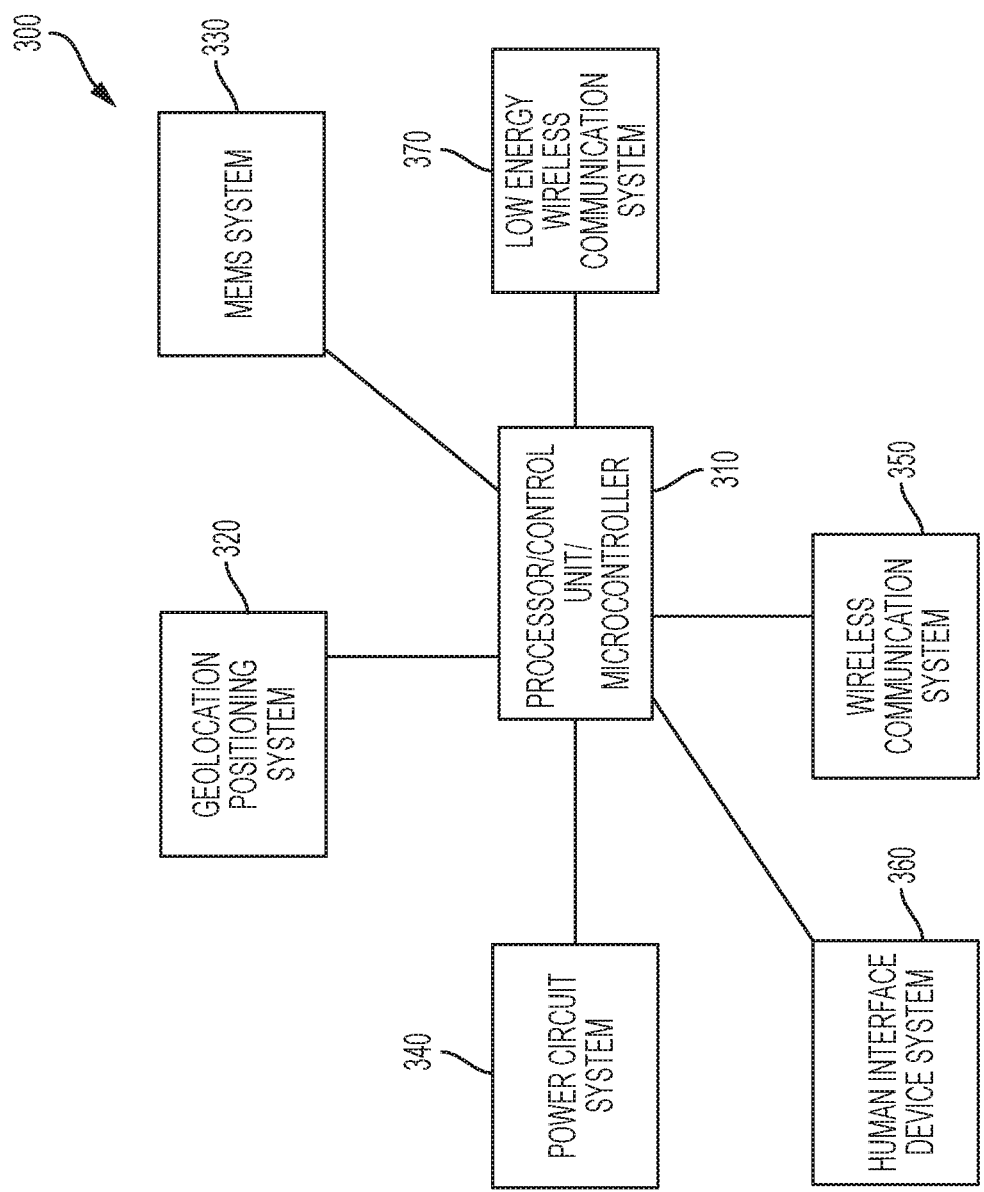
FIG. 3 is block diagram illustrating one embodiment of elements contained in a location device.

Turning now to FIG. 3, the block diagram illustrates system 300, which comprises subcomponents of a location device 10 in one embodiment. In one embodiment, the location device 10 includes a processor/control unit/microcontroller 310. Processor 310 may be an application specific integrated circuit (ASIC) or a general purpose processor. The processor 310 is in direct or indirect communication with a plurality of other components shown in FIG. 3 that enable the location device 10 to detect its position or location with a high degree of accuracy. Processor 310 may coordinate the functions of other modules described herein. Processor 310 may further execute algorithms to increase accuracy of geolocation positioning, provide timely communication between the location device and one or more servers. In some embodiments, processor 310 further operates a link between a low-energy wireless communication module 370 and any external beacons positioned outside of vehicle 20.

In one embodiment, the location device 10 includes a geolocation positioning system 320, which is used to determine the location of the location device 10 (and the vehicle 20 in which location device 10 resides) at any given point in time and any geographical context. The geolocation positioning system 320 is in communication with processor 310. The geolocation positioning system 320 may comprise a custom processor that can receive and process satellite signals, such as global navigation satellite system (GNSS) signals (e.g., GPS, GLONASS, Galileo, etc.). The geolocation positioning system 320 may further include an antenna, amplifiers, signal filters, and the like, to effectively process received GNSS signals. The geolocation positioning system 320 transmits GNSS signals to processor 310 for further processing. In one embodiment, the geolocation positioning system 320 comprises a reduced feature set to make the geolocation positioning system 320 affordable and functional for use in consumer devices. For example, in some embodiments, the geolocation positioning system 320 lacks the ability to process raw GNSS data. In some embodiments, the geolocation positioning system 320 may lack the ability to reduce or eliminate the effects of multipath signal distortion on its own. When a reduced feature set geolocation positioning system 320 is typically used, the reduced feature set generally prevents the geolocation positioning system 320 from performing adequately in dense urban areas. For example, a vehicle 20 with location device 10 (including a reduced feature set geolocation positioning system 320) can be parked on a side of a street that is adjacent to a parking meter in a legal parking zone. Yet, the reduced feature set geolocation positioning system 320 might erroneously determine its location as standing next to the street's centerline or in a building due to multipath signal distortion. Even a more expensive GNSS processor may not be able to mitigate against multipath signal distortion on their own. However, when the geolocation positioning system 320 is configured with certain other systems discussed below, the geolocation positioning system 320 provides high accuracy location detection despite the reduced feature set of geolocation positioning system 320. The reduced feature set also enables the geolocation positioning system 320 to use less power in operation. In some embodiments, geolocation positioning system 320 will detect a location of the location device 10 within approximately 4 meters or less, as well as parking events.

In alternative embodiments, various solutions can be adopted to help provide the desired positioning or location accuracy for location device 10 with GNSS corrections data. For example, a differential GPS system assisted by the data received from the continuously operating reference stations (CORS), such as the one described in U.S. Pat. No. 5,490,073 (which is hereby incorporated by reference in its entirety), can provide help determining positioning in a dense urban environment. At present, there are several publicly operating CORS networks in the United States, such as NYSnet in the state of New York. The data from the CORS network can be obtained by the geolocation positioning module 320 in the location device 10 via established protocols, such as the RTCM 10403.1 standard or other suitable standards. In another embodiment, real-time kinematics data and raw data from the receiver are used to evaluate pseudo ranges and other variables in a custom algorithm that can be implemented in an ASIC or software, to determine a more precise location of the location device 10 (and the vehicle 20). In further embodiments, alignment to road maps, Assisted GPS, and other suitable techniques can be used to aid in determining the desired positioning or location accuracy of the location device 10.

In one embodiment, system 300 further includes MEMS system 330. The processor 310 is in communication with the MEMS system 330. In one embodiment, the MEMS system 330 is an inertial measurement sensor (IMU) that comprises at least an accelerometer and a gyroscope. The MEMS system 330 can measure linear and angular motion of the location device 10. In some embodiments, the MEMS system 330 further comprises a magnetometer. The MEMS system 330 may comprise other suitable sensors. When processor 310 combines data from geolocation positioning system 320 and the MEMS system 330, the processor 310 can more accurately determine the position of the location device 10 in vehicle 20. This increased accuracy assists in establishing the parking events and parking sessions while using a reduced feature set geolocation positioning system 320. In some embodiments, when the geolocation positioning system 320 is not operating properly (e.g., it cannot receive satellite signals when under a bridge or in a tunnel), data from the MEMS system 330 may supplant data from the geolocation positioning system 320 to assist in establishing the parking events and parking sessions. In some embodiments, system 300 of location device 10 may not include a MEMS system 330.

In one embodiment, system 300 further includes a power circuit system 340. The power circuit system 340 may include one or more batteries, a charging port, an electrical outlet, and a power management integrated circuit. The power circuit system 340 supplies power to the various components of system 300 in location device 10. In some embodiments, power circuit system 340 monitors power reserves and communicates with processor 310 to determine when to reduce operations of certain system 300 components to conserve power or when to shut down location device 10. In some embodiments, power circuit system 340 and processor 310 may restrict certain processes (e.g., initiating a parking session) when power circuit system 340 determines that available power levels are below a certain threshold. In a parking and payment system example, if the main battery of location device 10 will not support the functioning of location device 10 for more than three hours, the power circuit system 340 and processor 310 may prevent location device 10 from initiating a parking session until battery levels are restored above the certain threshold. In some embodiments, the location device 10 uses the battery to keep some operational information in buffers to enable the location device quickly start (instead of a cold start where the location device 10 may have to go through a longer boot/initialization procedure to be usable). In some embodiments, the location device 10 includes a second battery to maintain satellite almanac information in RAM buffers. This enables the location device 10 to start without having to reestablish the Time To First Fix with the satellites.

In one embodiment, system 300 further includes a wireless communication system 350. Wireless communication system 350 provides a communication link between the location device 10 and at least one server (through the communications links discussed herein). The wireless communication system 350 may include a cellular data processor, an antenna, a SIM card, and other components necessary to communicate with mobile networks, like mobile network 110. In some embodiments, communications from processor 310 to the server (through mobile network 110) follows a predefined protocol and can be established, for example, through Internet connections based on HTTP protocols (e.g., GET and POST request methods), through a protected Virtual Private Network (VPN), or a combination of both. For example, location device 10 and a server in data center 120 can be connected via a VPN tunnel created using the processor 310 in communication with wireless communication system 350. In some embodiment, the connection can be constantly refreshed and the messages reach both destinations (location device 10 and the server) through open sockets. In one embodiment of a parking and payment system, a server from data center 120 sends a signal (request message) to start a legal parking session with values for the expiration time of the legal parking session, for example, "START 1290 10:23:44 08:23:44 1". The message can be space- or tab-separated and can be deciphered by the device as: start the legal parking session in a legal parking zone with a known ID 1290, the current time on the server (when the legal parking session starts) is 08:23:44, and the legal parking session can last until 10:23:44. In one embodiment, the location device may notify the geomapping server with a flag 0 or 1 in the end of a message to start a parking session whether the request for the legal parking session was initiated (1) automatically after a predetermined amount of time or (2) was initiated manually by the user via a mobile device or using a human interface device system described below. For example, if the parking session starts automatically (without the user taking affirmative action on the human interface device system or mobile device) and the location device notifies the geomapping server with the flag 1, the user has one minute to cancel the parking session to prevent accruing charges for a legal parking session. An example where the user may need to cancel the parking session includes the user merely waiting to pick up a passenger, the user determines that the user requires a different parking spot, or for some other suitable purpose). On the other hand, a message with the flag 0 will inform the geomapping server to start the parking session immediately given that the user provided explicit approval because the user affirmatively initiated a parking session via a mobile device or human interface device system. In one embodiment, time zone information can be transmitted from the server to the location device 10 in a message since the location device 10 might not know the local time zone, but rather the UTC time.

In one embodiment, system 300 further includes a human interface device system (HID) 360. The HID 360 may include one or more buttons that the user can press. The HID 360 may include one or more LED lights that can provided the user with useful system status information. In some embodiments, HID 360 includes a screen capable of generating and displaying messages to the user (e.g., reporting battery life, reporting system status, reporting legal parking zone information, etc.). The HID 360 communicates with processor 310 to receive user input or to provide the user with information.

In one embodiment, system 300 further includes a low energy wireless communication system 370. The low energy wireless communication system 370 may comprise a processor, an antenna, and other components necessary to communicate with other low energy wireless devices. The low energy wireless communication system 370 may be configured to communicate over a predetermined protocol, such as IEEE 802.15 (e.g., Bluetooth). The low energy wireless communication system 370 can communicate with processor 310 of system 300 in location device 10. In some embodiments, low energy wireless communication system 370 can communicate with remote parking enforcement devices, beacons in parking garages, and other similarly configured wireless devices, which may facilitate location detection in places with no or limited satellite system signals (e.g., in locations where GNSS signals cannot be obtained).

Figure 4:
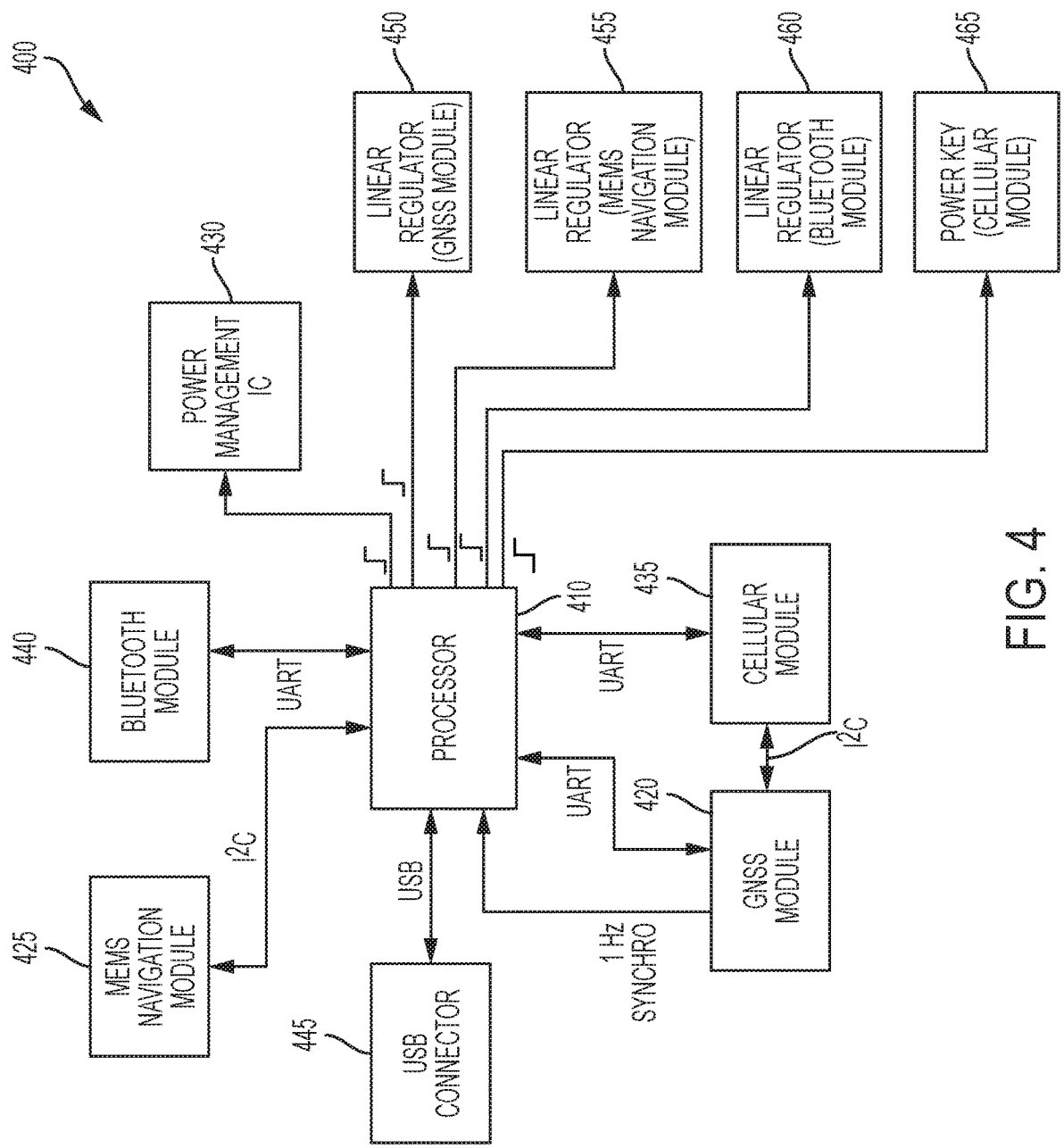
FIG. 4 is a block diagram illustrating one embodiment of the signaling between components of the location device.
Figure 5:
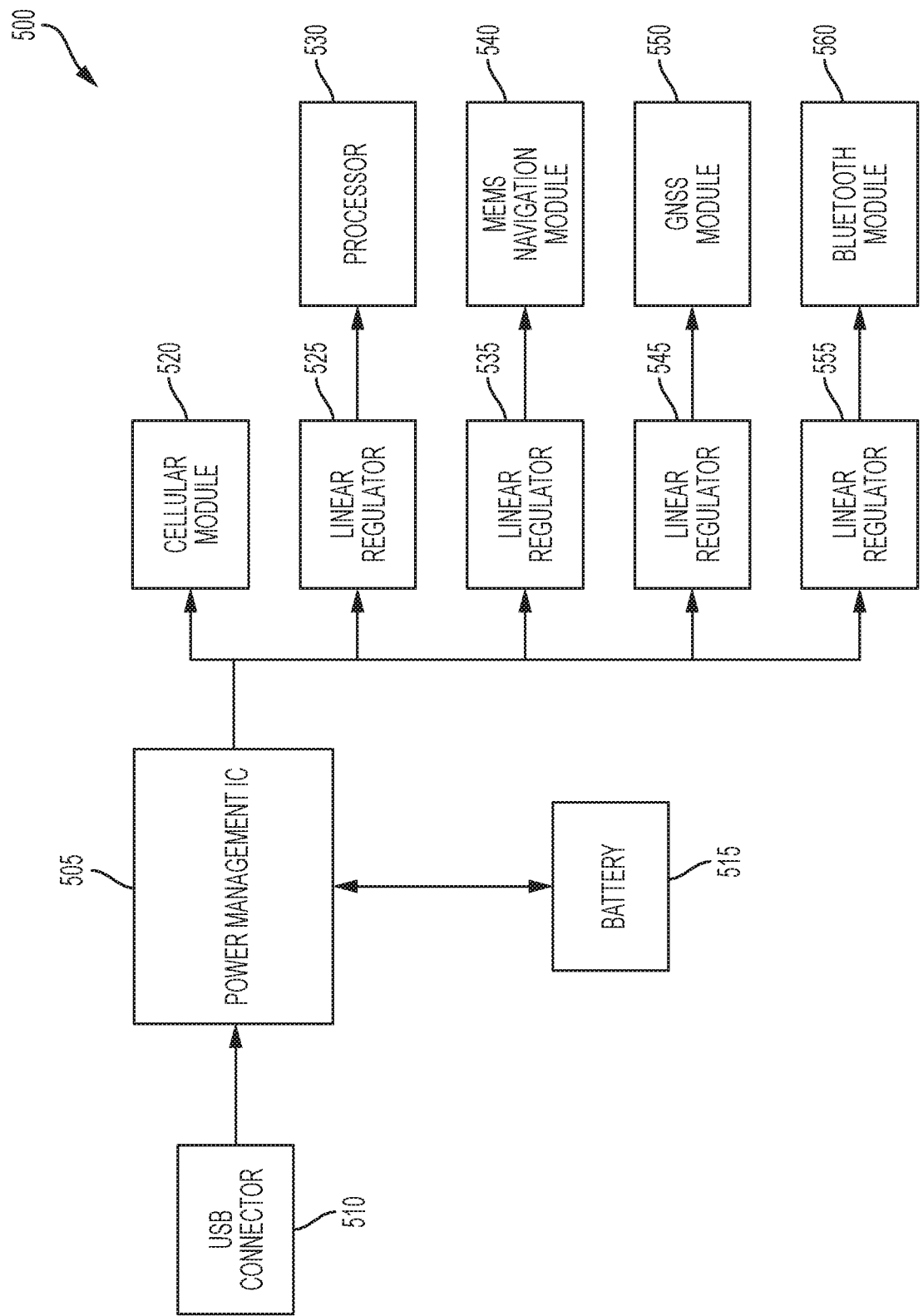
FIG. 5 is a block diagram illustrating one embodiment of the connections between the power subsystems of the location device.
Figure 6:
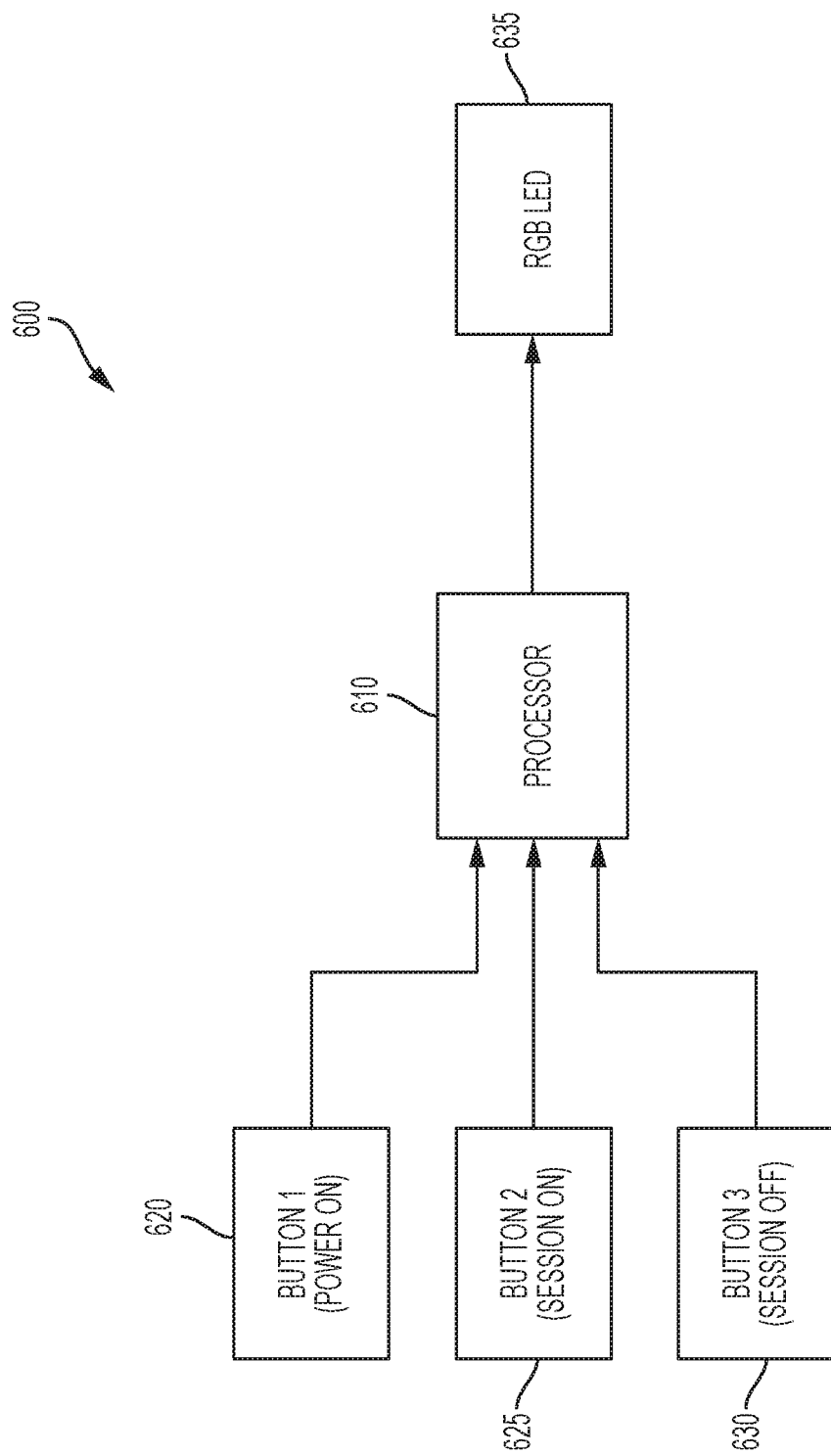
FIG. 6 is a block diagram illustrating one embodiment of the connections between the human interface device subsystem of the location device.

FIGS. 4, 5, and 6 are block diagrams that illustrate more detail regarding some of the components of system 300 in location device 10, which were discussed in connection with FIG. 3.

Turning now to FIG. 4, one embodiment of the signaling between certain components of the location device 10 are illustrated. As noted in FIG. 3, the processor 410 (also shown as processor 310 in FIG. 3) is in communication with a plurality of different components. In various embodiments, processor 410 manages power, collects, and uses information from the different modules illustrated in FIG. 4. The processor 410 is in communication with GNSS module 420 (which is a component of geolocation positioning system 320) via universal asynchronous receiver-transmitters (UART). Information about coordinates from the GNSS module 420 are transmitted to the processor 410 via UART. The GNSS module 420 may generate a 1 Hz pulse and transmit the 1 Hz pulse to the processor 410 in some embodiments. The 1 Hz pulse is used to synchronize data from the different modules or components that communicate with processor 410.

Also illustrated are a MEMS Navigation module 425 (which is a component of MEMS system 330 in FIG. 3), cellular module 435 (which is a component of wireless communications system 350 in FIG. 3), and Bluetooth module 440 (which is a component of low energy wireless communication system 370 in FIG. 3). The MEMS Navigation module 425 communicates with the processor 410 via Inter-Integrate Circuit (I²C) while cellular module 435 and Bluetooth module 440 communicate with processor 410 via UART. It should be appreciated that the modules described herein may communicate with processor 410 using any suitable method. For example, the MEMS module transmits inertial measurement data via I²C to processor 410, which can be used to help correct the coordinates data that processor 410 obtains from the GNSS module 420. Processor 410 transmits data via UART to cellular module 435, through which the location device 10 communicates with a server to transmit the current state of the location device 10 such as location device 10's coordinates and status. In some embodiments, GNSS module 420 can communicate with the cellular module 435 via I²C to supply the GNSS module 420 with GNSS corrections data. In some embodiments, firmware on location device may be updated through the cellular module 435 in communication with processor 410. In some embodiments, the Bluetooth module 440 communicates with the processor 410 via UART to establish a connection between the location device 10 and the user's mobile device 140.

USB connector 445 is illustrated as connected to the processor 410 via the universal serial bus standard. In alternative embodiments, location device 10 does not include a USB connector 445. In some embodiments, location device 10 includes other types of suitable connectors. In various embodiments, USB connector 445 can be used to power the location device 10, charge batteries in location device 10, and update firmware on location device 10.

The power management IC 430 (which is a component of power circuit system 340 in FIG. 3), linear regulator 450, linear regulator 455, linear regulator 460, and a Power Key 465 are in communication with processor 410. Processor 410 can control, using logic levels, the power of the device as well as power to different components illustrated in FIG. 4 in some embodiments. For example, processor 410 can turn off the entire location device 10, or turn off output of the power linear regulators 450, 455, and 460 to the individual modules (power connections between the modules are illustrated in FIG. 5). Processor 410 can also turn off the cellular module 435 by sending logic level signal to the Power Key 465 in some embodiments. In some embodiments, the ability to selectively shut down the different modules creates a very power efficient device.

FIG. 5 illustrates a block diagram of one embodiment of a power circuit system 500 (which corresponds to power circuit system 340 in FIG. 3) showing power supply interconnections. In one embodiment, the center of the power supply is a power management integrated circuit (IC) 505 that is configured to receive power from both the USB connector 510 (which corresponds to USB connector 445 in FIG. 4) and the battery 515 and dynamically switch between the two power supplies. In some embodiments, if the USB connector 510 is used for power, power management IC 505 causes the battery to be charged. In the illustrated embodiment, cellular module 520 (which corresponds to cellular module 435 in FIG. 4) is fed directly from power management IC 505. The other illustrated modules processor 530, MEMS navigation module 540, GNSS module 550, and Bluetooth module 560 are all powered via LDO (Low Dropout) linear regulator 525, linear regulator 535, linear regulator 545, linear regulator 555. As noted above, the modules in FIG. 5 correspond to modules discussed above in FIG. 4, which are components of the systems discussed in FIG. 3. As also noted above in connection with FIG. 4, this configuration enables processor 410 to control power supplied to the various modules to ensure efficient use of power. For example, processor 410 can shut down GNSS module 550 where processor 410 determines that the location device 10 is in a location where no GNSS signals can be received (e.g., a parking garage). Processor 410 can be configured to selectively shut down different modules under different triggering conditions to ensure maximum battery life or most efficient power consumption of the location device 10. As another example in a parking and payment system, processor 410 may determine that once a parking session has been started for location device 10, processor 410 can supply power to MEMS navigation module 540, but restrict power to the other modules until a triggering event occurs (e.g., the location device moves; a button press on the location device). Triggering events may include the MEMS navigation module 540 detecting motion of the location device 10 over a certain speed, or the expiration of time in a legal parking zone. In this manner, the location device 10 uses the minimum amount of power necessary to maintain operation of the location device 10 in the parking and payment system.

FIG. 6 illustrates a block diagram of one embodiment of a human interface device (HID) system 600 (which corresponds to HID system 360 in FIG. 3) showing human input and feedback mechanisms of location device 10. In the illustrated embodiment, processor 610 (corresponding to the processor 310, 410, etc.) is connected to button 620, button 625, button 630 and LED 635. It should be appreciated that fewer buttons or more buttons can be added to location device 10. In some embodiments, a plurality of LED lights are used to supply information to a user of location device 10. In some embodiments, a display screen may be included in addition to or in place of the LED 635. In the illustrated embodiment of FIG. 6, button 620 is associated with turning the power on to location device 10; button 625 is associated with triggering a parking session to start; and button 630 is associated with triggering a parking session to end. The buttons may be configured to trigger any suitable function. In some embodiments, one or more buttons may be associated with a plurality of different functions. In some embodiments, HID system 600 may include another reset button to reset location device 10 to a default operational state. The reset button may be recessed from the surface of the location device 10 to prevent accidental activation. In one embodiment, LED 635 provides information status to a user in a variety of different ways. In some embodiments, LED 635 may illuminate a particular color when the device is powered on, illuminate a different color when a parking session is started, illuminate yet a different color when a parking session is complete. In some embodiments, the processor 610 may cause the LED 635 to flash in different patterns to alert the user of different events (e.g., communication mode, low battery mode, charging mode, etc.).

Turning now to the operations of location device 10, as noted above, location device 10 can be configured with different GNSS modules which can produce a variety of levels of coordinate accuracy. As noted above, some uses of location or positioning data require a high degree of accuracy. For example, some require positioning accuracy of approximately four meters or less. Obtaining this level of accuracy can be difficult in certain situations, like dense urban setting, whether using expensive GNSS modules or less expensive GNSS modules. Obtaining usable GNSS data in dense urban setting introduces a number of challenges. High buildings in "urban canyons" can completely block GNSS signals from a number of satellites which results in a poor satellite geometry. Parking garages tend to also completely block GNSS signals. GNSS signals can be reflected by various surfaces which leads to the non-line-of-sight (NLOS) GNSS signal reception as well as the multipath contamination of GNSS signals. When a GNSS receiver is placed inside a vehicle, the sky view is additionally obstructed by the roof of a vehicle and multipath effects are potentially enhanced by bodies and objects present in the vehicle. Many GNSS modules and systems (e.g., GNSS receivers and antennas) are vulnerable to the aforementioned effects. The aforementioned effects can result in long position detection convergence times and coordinate jumps of more than 10 meters. Some high end GNSS receivers are configured to mitigate some of the impact of the above mentioned negative effects on a hardware level. However, such high end GNSS receivers are extremely expensive, extremely large, require high energy consumption, and still suffer from the same issues. These high end GNSS receivers are unavailable for mass-market platforms due to the high cost, unacceptable physical sizes, and high energy consumptions of these devices. Moreover, in a dense urban setting, even high end GNSS receivers are often not capable of overcoming issues derived from poor satellite geometry, NLOS signals reception, and multipath effects to provide coordinates output of a sufficient integrity (e.g., approximately four meters of less) to be useful for location systems that require high accuracy position detection.

Thus, a need exists for a high accuracy location (or position) detection system that can use inexpensive, low end GNSS receivers. As will be discussed in FIG. 7 and FIG. 8, the disclosure herein details a high accuracy location (or position) detection system that can use inexpensive GNSS receivers and supplement the GNSS data streams with at least one or more other location data sources to achieve a high accuracy location detection of approximately four meters or less, but is low in cost, small in physical size, and low in energy consumption.

Figure 7:
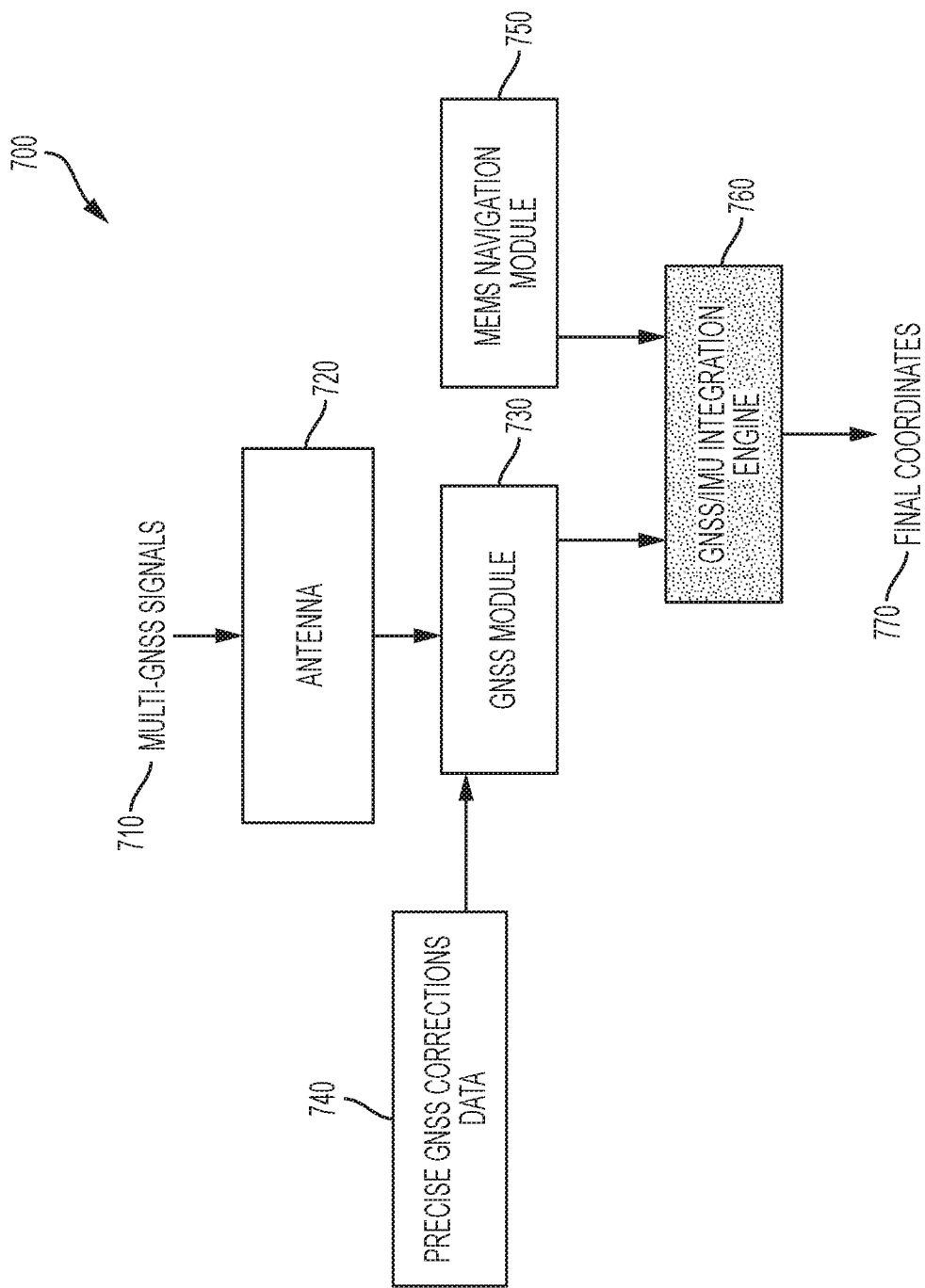
FIG. 7 is a flowchart illustrating one embodiment of the signal processing paths of location data in the location device.

FIG. 7 is a flowchart of one embodiment illustrating signal processing paths of process 700 that obtains location data streams at the location device 10. One or more processors in location device 10 will convert the location data streams into high accuracy location data associated with the location device 10. In one embodiment, location device 10 obtains location data streams from a plurality of sources. The sources may include GNSS signals 710 from satellites such as GPS and GLONASS; GNSS corrections data 740, and internally generated inertial measurement data (generated by MEMS navigation module 750). In some embodiments, location device 10 may also obtain GIS data (not shown). Location device 10 may obtain other suitable data input streams in alternative embodiments. It should be appreciated, that some or all of the location data input streams illustrated in FIG. 7 may not be used or obtained in some embodiments. When available and as needed, GNSS module 730 obtains GNSS signals 710 from available satellites through an antenna 720. The GNSS signals 710 may include information such as, but not limited to: GPS timestamp; latitude, longitude, height; solution status; ground speed; and azimuth.

In some embodiments, the GNSS module 730 may also obtain GNSS corrections data 740, although this is not required in some embodiments. While not shown, in some embodiments, GNSS correction data 740 may be obtained from a processor such as processor 310 of the location device 10. Processor 310 may obtain such GNSS correction data 740 via a server in data center 120 or a server connected to Internet 130 through mobile network 110. In some embodiments, GNSS correction data 740 may be received from other sources such as fixed ground-based reference stations. The GNSS correction data 740 may include differential GPS data, ephemeris, almanac, accurate time, satellite status, and any other suitable data points. As will be discussed further below, a processor of the location device 10 (e.g., processor 310) may apply the GNSS correction data 740 to received GNSS signals 710 to calculate and determine more precise GNSS location data of location device 10.

MEMS navigation module 750 (which corresponds to MEMS system 330 and MEMS navigation module 425) includes sensors such as an accelerometer and a gyroscope. When MEMS navigation module 750 is activated, in some embodiments, the accelerometer and gyroscope are configured to run substantially simultaneously to generate and capture motion data from these sensors of location device 10. In some embodiments, the MEMS system 330 obtains data such as: linear acceleration, magnetic fields, and an angular rate. In some embodiments the MEMS system 330 may include at least three distinct channels of each measurement to obtain inertial motion data in 3 dimensions.

The GNSS module 730 and the MEMS navigation module 750 transmit their data to the GNSS/IMU integration block 760, which synchronizes the data streams and calculates a final set of coordinate data 770. Final coordinates 770 are set to a 1 Hz output rate provided in some embodiments by the GNSS module 730. It should be appreciated that a processor, such as processor 310 in location device 10, may be responsible and configured to receive the data streams from the GNSS module 730 and the MEMS navigation module 750 and perform the synchronization and calculations. In some embodiments, processor 310 may receive the precise GNSS corrections data 740 and apply corrections to GNSS signals from GNSS module 730 without routing the precise GNSS corrections data 740 to the GNSS module 730.

Figure 8:
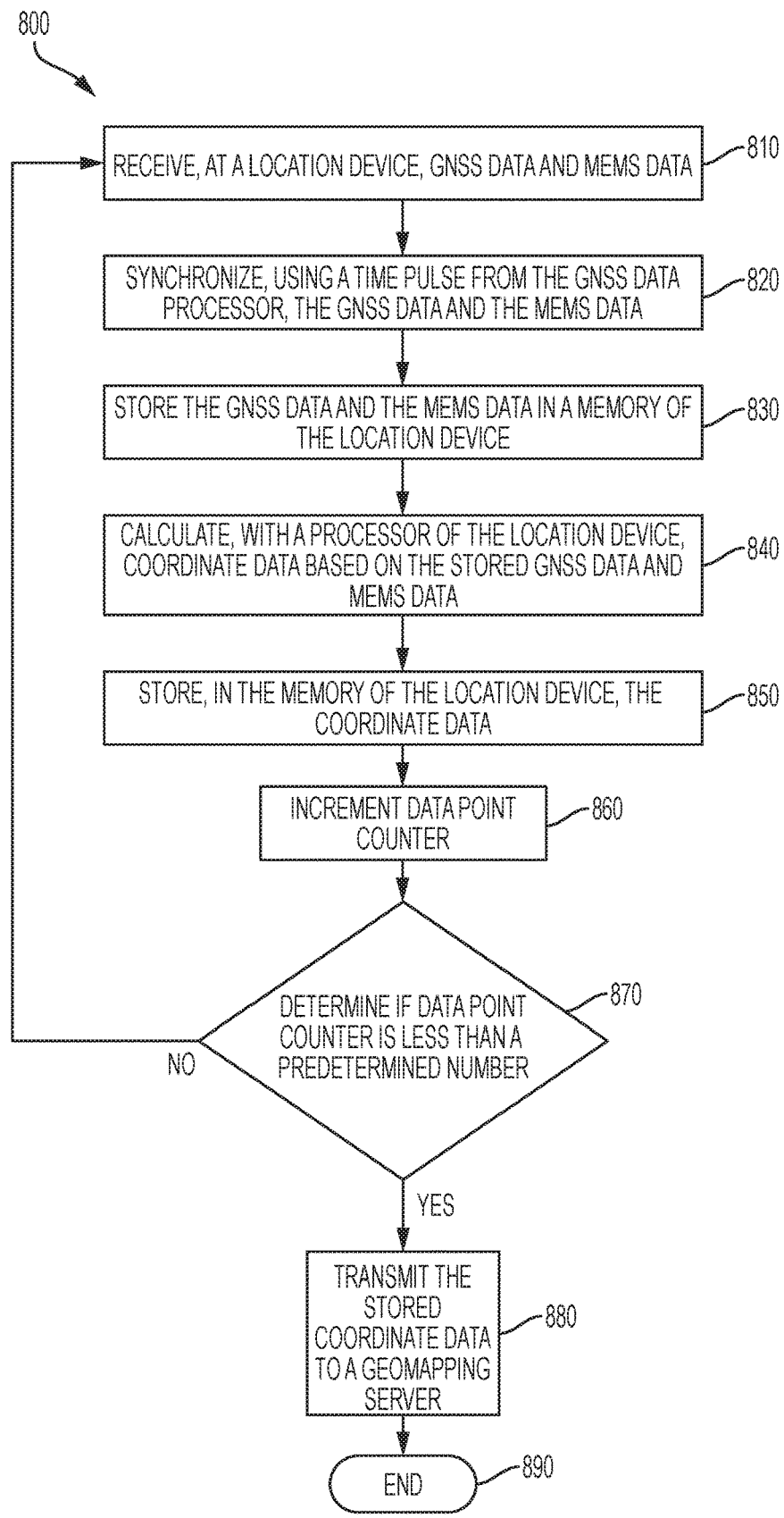
FIG. 8 is a flowchart that illustrates one embodiment of the system and method for capturing and calculating coordinate data of a location device.

FIG. 8 is a flowchart of process 800 that illustrates one embodiment of the system and method for capturing and calculating high accuracy coordinate data of location device (e.g., location device 10). At block 810, a GNSS module receives at least one or more sources of GNSS data in one embodiment. The one or more sources of GNSS data correspond to at least one geographic position at one point in time for the location device. As noted in FIG. 7, the GNSS module may receive GNSS satellite data or GNSS satellite data plus correction data from a plurality of other sources in some embodiments. Where more than one source of GNSS data is received, a processor of the GNSS module may modify GNSS satellite data with any received corrective data. At block 810, a MEMS module generates and obtains MEMS data (e.g., inertial motion data or location data) in some embodiments. The GNSS module and the MEMS module transmit their obtained location and sensor data to a processor of the location device. In some embodiments, as noted above, the GNSS module obtains timing data from the GNSS data and uses this data to generate a synchronizing timing pulse. In one embodiment, the synchronizing timing pulse is a 1 Hz timing pulse. The timing pulse is also transmitted from the GNSS module to the processor of the location device.

At block 820, the processor of the location device synchronizes, using the timing pulse from the GNSS data processor, the received GNSS data and the MEMS data in one embodiment. At block 830, the processor of the location device may then store the synchronized GNSS data and the MEMS data in a memory of the location device in some embodiments. The storage can be in buffers or in longer term memory storage in some embodiments.

If the processor of the location device determines that the synchronized GNSS data and MEMS data is stored in memory (buffers or more persistent memory), the processor in some embodiments, may then calculate coordinate data based on the stored GNSS data and MEMS data as illustrated in block 840. The processor may execute a number of calculations on the GNSS data and MEMS data. In one embodiment, the processor applies a Kalman filter to the GNSS data and MEMS data to obtain the resulting coordinate data. However, it should be appreciated that other suitable filters and calculations may be applied to the GNSS data and MEMS data to obtain cleaned up coordinate data for the location device. In some embodiments, the filtering process may assign different weights to the data inputs (e.g., GNSS data and MEMS data). For example, if the location device is under a bridge and the GPS signal is poor, the location device may assign a lower weight to the GNSS data and a higher weight to the MEMS data for purposes of calculating the coordinate data of the location device. As previously noted, the processor may also obtain GIS data and use GIS data in addition to the other data sources to calculate a set of final coordinate data in some embodiments. The processor may generate coordinate data that includes a timestamp, latitude, longitude, and ellipsoidal height. Other suitable outputs can be calculated based on the location data input. In some embodiments, the processor may generate coordinate data with fewer data items. As illustrated in block 850, the processor of the location device may store, in a memory of the location device, the calculated coordinate data.

The processor also may increment a location data point counter in some embodiments as shown in block 860. In some embodiments, obtaining a single coordinate data point may be sufficient for location detection purposes. In such embodiments, process 800 may skip block 860, block 870, and block 880 to terminate at block 890. The processor of the location device may then transmit the obtained single coordinate data point to a local system or module or to a remote system to use the coordinate data determined for the location device.

On the other hand, in some embodiments, a plurality of coordinate data points may be required to account for errors that arise in the location detection process. In one embodiment, the processor of the location device may require a predetermined amount of coordinate data points for better, more accurate location detection. For example, in a parking and payment system using the high accuracy location detection described herein, the parking and payment system may require 10 different coordinate data points to confirm that a location device is in a particular geographic location. It should be appreciated that fewer or more coordinate data points can be used in the parking and payment system or other systems using the high accuracy location detection. In such an embodiment, the processor determines if the location data point counter is less than a predetermined number in decision block 870. If the processor determines that the location data point counter is less than a predetermined number, then processor returns to block 810 to obtain at least one additional coordinate data for the location device.

If the processor determines that the location data point counter is equal a predetermined number, then processor moves to block 880 to transmit the stored coordinate data. As noted above, the processor of the location device may then transmit the obtained coordinate data points to a local system or module or to a remote system to use the coordinate data determined for the location device. As illustrated in block 880, in this embodiment, the processor transmits the coordinate data to a geomapping server for further processing and the process 800 ends at block 890.

It should be appreciated that the high accuracy location detection of the location devices may not have GNSS data available for the location detection in some embodiments. While not shown, the process 800 of determining the geographic position of the location device may use other sources of location data. For example, low energy wireless beacons may be installed throughout a geographic region. These low energy wireless beacons may broadcast location information similar to the GNSS data obtained from satellites. In one embodiment, a location beacon may be installed in a parking garage. Thus, when the location device enters such a parking garage and other sources of location data are lost, the location device can receive the location data broadcasts from the beacon to determine that the location device is in a particular garage. Similarly, cellular tower triangulation and IEEE 802.11 (wifi) triangulation can be used when other location data signals are unavailable.

It should be appreciated that a low cost, but high accuracy location detection can be used in a number of different systems that required geographic position information. In one embodiment, as noted above, an automated parking and payment system may require a high accuracy location detection to determine whether a location device is parked in a legal parking zone. The high accuracy location detection is useful for improved direction systems to avoid providing incorrect directions (the more accurate position information can be supplied to a mobile phone's mapping application to obtain better directions). In some embodiments, the location device can be installed in corporate vehicle fleets to collect and provide accurate data for managing the vehicle fleets. In an alternative embodiment, the location device can interact with toll pass systems to provide toll payments and reduce the quantity of devices a user must maintain in a vehicle. In another embodiment, the location device and the high accuracy location detection system may track a variety of different data points about a vehicle's use for insurance data analytics. The above list of uses for the high accuracy location detection system and method are merely examples and other suitable users are contemplated.

For purposes of further discussion, FIGS. 9-13C will describe in greater detail, some embodiments that apply the use of a low cost and high accuracy location detection system.

Figure 9:
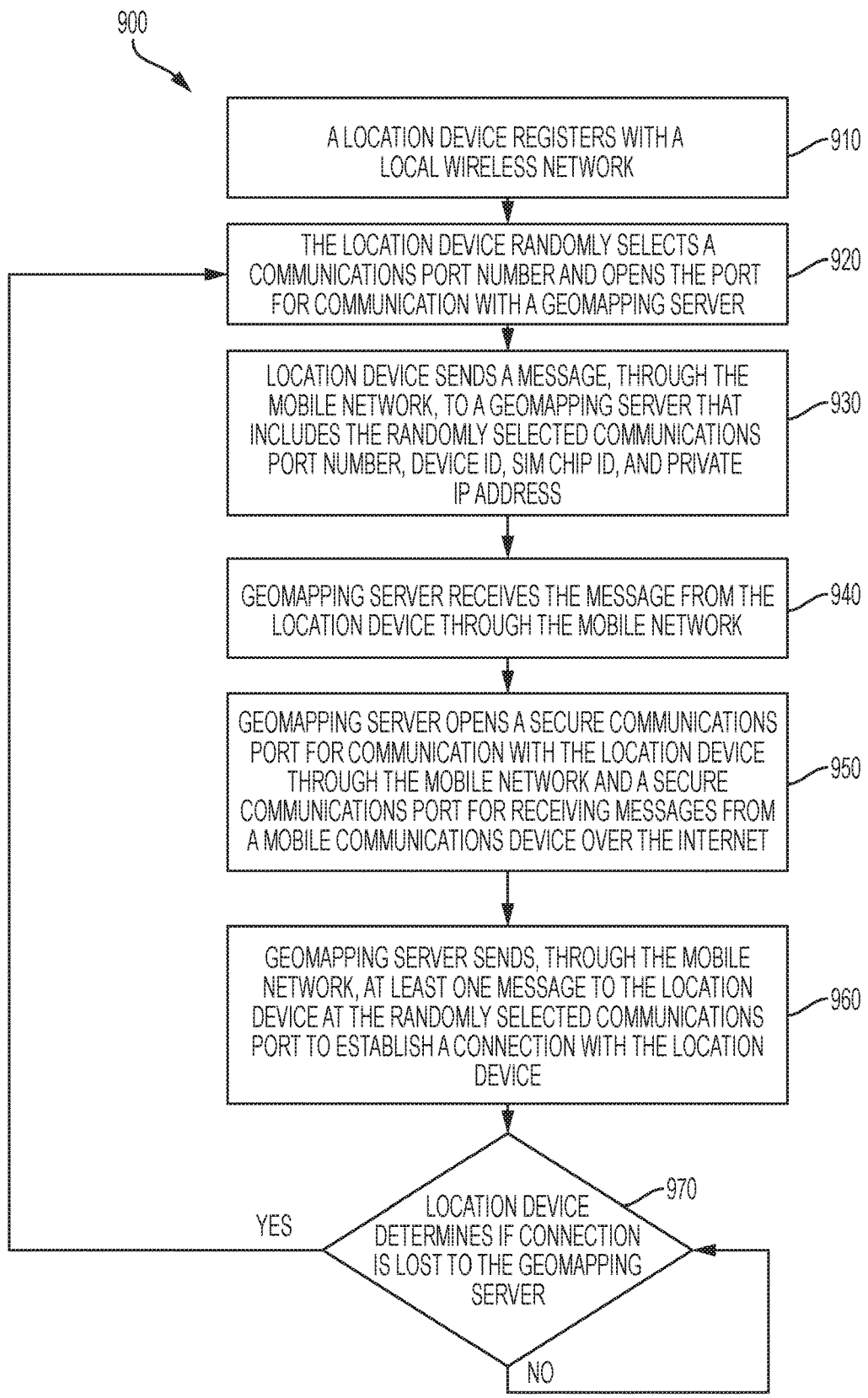
FIG. 9 is a flowchart that depicts one embodiment of the location device connecting with a geomapping server for secure communications.

FIG. 9 is a flowchart that depicts one embodiment of the location device 10 connecting with a geomapping server in data center 120 for secure communications in process 900. For security purposes, prior to process 900 starting, a location device 10 may be assigned and configured with certain identifying information such as a private Internet Protocol (IP) address, a device ID, a subscriber identification in a subscriber identification module (SIM) chip, and information on how to contact the geomapping server. The geomapping server or some related server or database is configured to store the assigned private IP address and SIM chip information associated with the location device for later verification during the registration and communication processes.

At block 910, a location device (such as location device 10) registers with a local wireless network (such as mobile network 110). In some embodiments, this may occur automatically when the location device is powered on or when a user presses a button on the location device. In one embodiment where the location device operates on a GSM network, the location device may execute an international mobile subscriber identity (IMSI) attach procedure. However, any suitable registration procedure may be employed to register the location device with the local wireless network. In one embodiment, the local wireless network is configured to recognize some unique identifying information associated with the location device to know that communications traffic from the location device should be routed in a predetermined manner to the geomapping server. In one such embodiment, a VPN tunnel is setup by the local wireless network to carry communications traffic from the location device to a geomapping server in data center 120.

In one embodiment, once the connection to the local wireless network has been established, the location device randomly (or pseudo randomly) selects a logical socket communications port number (e.g., one of the transmission control protocol (TCP) port numbers) and opens the randomly selected port for communication with a geomapping server in block 920. In one embodiment, only the location device initially knows the randomly selected communications port number. In this manner, if the location device receives messages or other communications requests on other communication port numbers, the location device will know that such communication requests are unauthorized. In some embodiments when the unauthorized communications requests are received at the unselected communication port numbers, the location device may turn off all communications on all ports as a way to prevent hacking attempts, denial of service attempts, or other unwanted intrusions or communications.

In one embodiment, the location device sends a message at block 930, through the mobile network (i.e., the local wireless network), to the geomapping server that includes the randomly selected communications port number, device ID, SIM chip ID, and private IP address. It should be appreciated that in some embodiments, a different set of information may be sent to the geomapping server to establish a connection. As noted above, message at block 930 may be sent through the mobile network through a VPN. The VPN encrypts the traffic communication between the location device and the geomapping server and keeps other hosts or endpoints on the mobile network from discovering the location device or geomapping server (e.g., from brute force pings to sets or subnets of IP addresses). However, in some embodiments, the communications traffic between the location device and the geomapping server on the mobile network may not be through a VPN. In some embodiments, the location device and geomapping server may encrypt communications traffic sent through the mobile network or may send the communications without encryption.

At block 940, the geomapping server receives the message from the location device through the mobile network in one embodiment. At block 950, the geomapping server may open a secure communications port (e.g., a TCP port) for communication with the location device through the mobile network and another secure communications port for receiving messages from a mobile communications device (e.g., mobile device 140) over an Internet connection (e.g., through Internet 130).

In one embodiment, the geomapping server sends, through the mobile network, at least one message to the location device at the randomly selected communications port to establish a connection with the location device, as illustrated in block 960.

In some embodiments, the processor of the location device determines if a connection is lost to the geomapping server or lost with the local wireless network (e.g. the mobile network) as illustrated in block 970. For example, the location device may send a ping message to the geomapping server after a predetermined amount of time has elapsed. In some embodiments, the pings may be repeated until the power is cut to the device or until a user actively terminates the location device's connection to the geomapping server. If the location device determine that the connection is lost to the geomapping server or lost with the local wireless network, the process 900 may return to either block 910 or 920, depending on which connection is lost. In the illustrated embodiment of FIG. 9, the connection to the geomapping server is lost so the location device starts process 900 again at block 920 to reestablish a connection with the geomapping server. It should be appreciated that in some embodiments, the process of reestablishing a connection is a manual process that must be executed by a user of the location device. For example, the user must press a button on the location device to start or restart process 900. In some embodiments, where the location device directly communicates with mobile device 140 (via USB or a low energy wireless connection), a user may cause mobile device 140 to issue commands to the location device to start or restart any part of process 900.

As noted above, process 900 is not restricted to any particular system and can be employed with any device attempting to establish a connection with a remote server.

FIGS. 10A, 10B, 10C, 10D, 10E, and 10F are illustrations of an embodiment using the high accuracy location detection in a parking and payment system. A parking session for a vehicle is started in a geographic location that is associated with a legal parking zone and then the parking session is stopped when the vehicle leaves the parking zone. The user places a location device (e.g., location device 10) in the vehicle 1000 (not shown). The location device registers with a local wireless network and establishes a connection to a geomapping server as discussed above in FIG. 9. With the location device, the user can drive in a city with legal parking zones (See, for example, FIG. 10A, reference 1010). The vehicle 1000 drives along K street in direction 1008 to what visually appears to be an available parking spot 1010. In FIG. 10B, the vehicle 1000 parks in parking spot 1010. In one embodiment, the location device automatically determines that the vehicle may be parked or the user presses a button on the location device to inform the location device to check on the parking zone. In some embodiments, the location device in vehicle 1000 determines the vehicle 1000's location using data streams from satellites 1020*a* and 1020*b* (and along with other location data streams discussed above).

After communicating with a geomapping server (not shown) the geomapping server determines that vehicle 1000 has arrived in a legal parking zone (FIG. 10C). In one embodiment, after a preset amount of time or after a manual action by the user (activating button on the location device), the location device sends a request to the geomapping server to start a parking session. If the geomapping server determines that a parking session successfully started, the geomapping server alerts the location device in one embodiment. As illustrated in FIG. 10D, in one embodiment, the location device changes an LED on the location device (turns it green or flashes the LED) to inform the user that a parking session has started. In some embodiments, the geomapping server sends information about expiration time, rate and hourly limit back to the location device (when the location device includes a display screen), to a mobile application on mobile device associated with the user, via other suitable methods of communication with the user, or some combination of the foregoing. In one embodiment where the location device includes a display, the location device may display the expiration time: for example, assuming that the zone has a 2-hour limit and now is 11:23 AM, the display will read, "EXPIRES AT 1:23 PM" (not shown). At some point between 11:23 AM and 1:23 PM the user returns to the vehicle 1000 and starts driving away in direction 1012 (FIG. 10E) from legal parking spot 1010. In one embodiment, the location device automatically detects movement (e.g., movement greater than 5 miles per hour using the GNSS module) and the location device sends a request to the geomapping server to end the parking session. In one such embodiment, the geomapping server stops the parking session, processes payment for the parking session (when required), and sends a payment receipt 1030 to the user (FIG. 10F).

Figure 11:
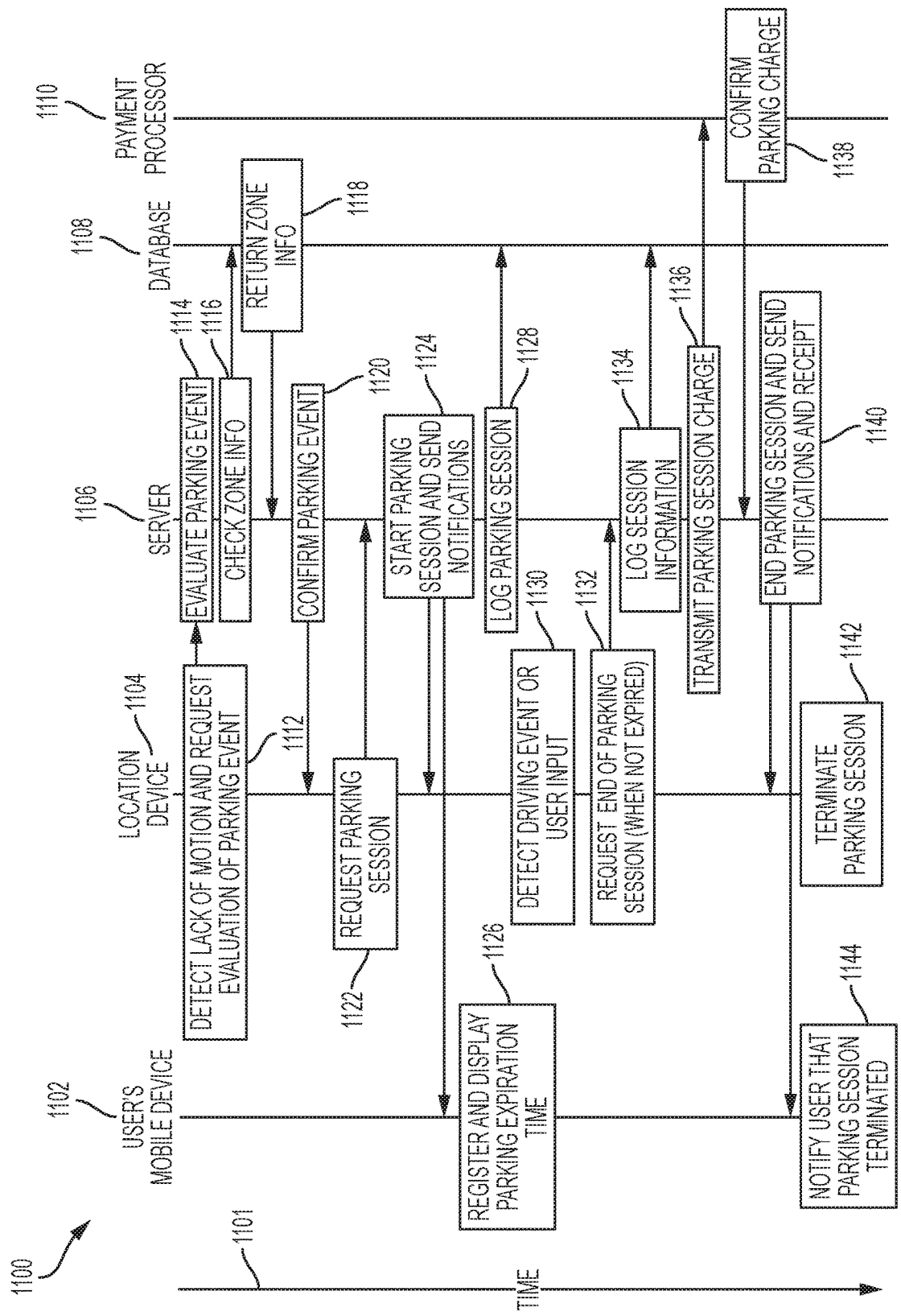
FIG. 11 illustrates one embodiment of a time-domain transaction diagram showing the operational processes and communication between certain elements of the disclosed system.

FIG. 11 illustrates one embodiment of a time-domain transaction diagram 1100 showing the operational processes and communication between certain elements of the parking and payment system using a high accuracy location detection system over time 1101. The diagram illustrates a plurality of elements such as a user's mobile device 1102, location device 1104, a server 1106, a database 1108, and a payment processing server 1110 and how these elements interact over time 1101 to provide a user with a novel parking and payment system. It should be appreciated that the various elements in diagram 1100 correspond to elements previously discussed. As with FIGS. 10A-10F, this diagram of FIG. 11 assumes that the location device 1104 is in a vehicle, the user's mobile device 1102 is in communication with the server 1106, and location device 1104 is registered with a local wireless network and has established a connection to a server 1106 as discussed above in FIG. 9.

Block 1112 illustrates that location device 1104 detected a lack of motion and requests an evaluation of a parking event from server 1106. The lack of motion may include motion less than a predetermined speed (e.g., less than 5 miles per hour) and triggers the location device 1104 to obtain location data as discussed in FIGS. 7 and 8. In one embodiment, location device 1104 obtains a predetermined quantity of coordinates of the location device over a predetermined quantity of time. In one embodiment, the location device 1104 obtains and generates 1 coordinate of the location device 1104 every second for 10 seconds as discussed above in accordance with FIGS. 7 and 8. Location device 1104 then sends these obtained 10 coordinates (as part of the evaluation request) to server 1106. It should be appreciated that server 1106 corresponds to the previously mentioned geomapping server and may be located in data center 120. It should also be appreciated that server 1106 may represent one or more such servers that may be in one data center or spread across multiple different data centers.

In some embodiments, location device 1104 may not be able to obtain coordinate data due to a number of factors. In some such cases, location device 1104 may inform the user (via an LED alert, display, or via a message to the mobile device 1102) that a parking session cannot be started (this process is not shown).

Returning to FIG. 11, server 1106 receives the request to evaluate the parking event 1114. The server 1106 may compare one or more of the received coordinates with coordinates stored in database 1108 to determine if any of the coordinates match with a stored legal parking zone (i.e., a legal parking zone) (see blocks 1116 and 1118). In some embodiments, all of the coordinates must match within a certain range to coordinates of the legal parking zone to be declared a match. In some embodiments, some predetermined percentage of the coordinates received from the location device 1104 must match coordinates associated with a legal parking zone stored in database 1108 before server 1106 determines that location device (or the vehicle) is in a legal parking zone. If the server 1106 determines that the coordinates received from location device 1104 result in a match to a legal parking zone, the server returns a message 1120 to location device 1104 confirming that the location device is in a legal parking zone. On the other hand, if the server 1106 determines that the coordinates received from location device 1104 do not result in a match to a legal parking zone, the server returns a message (not shown) to location device 1104 requesting a retry of the process starting at 1112, that parking is not permitted, or that the user should initiate a manual parking payment process. If the location device 1104 makes too many attempts to confirm a parking event within a predetermined period of time that result in no matches to a legal parking zone, the location device 1104 or server 1106 may halt further retries of the process for a predetermined amount of time. One embodiment of blocks 1112-1120 is discussed below in greater detail in FIG. 12.

Once location device 1104 receives the confirmation 1120 that the location device is in a legal parking zone, the location device 1104 may request the start of a parking session as illustrated in block 1122. The location device 1104 may make the request automatically to server 1106. In some embodiments, the location device 1104 makes the request to server 1106 after a user pushes one or more buttons on the location device 1104 to send the request. In some embodiments, the user may initiate the request to start a parking session from mobile device 1102 (not shown). In some embodiments, the location device 1104 waits a predetermined amount of time before sending an automated request to start a parking session to server 1106. For example, the location device 1104 may wait one minute or some other suitable amount of time. The location device 1104 may enable the user to press a button on the location device to prevent the location device from sending a request to start a parking session.

In one embodiment, when the location device 1104 starts a parking session, the location device may shutdown or restrict power to one or more modules in the location device. For example, during a parking session, the location device 1104 does not require the receipt of GNSS data. As such, at the start of a parking session, the location device 1104 may shutdown or restrict power to the GNSS module. It should be appreciated that the location device 1104 may evaluate each module given a particular situation to determine whether the module is required for the particular situation. If the module is not required, the location device 1104 will shutdown or restrict power to such modules. It should be appreciated that in some embodiments, using the situational power restrictions in the location device may enable the location device to extend its battery life by 2 times or 3 times over its run time compared to the situation when all of the modules of the location device were left running all of the time, creating a much more efficient device.

At block 1124, the server receives the request and starts a parking session associated with the location device 1104 in the legal parking zone. The server may send notifications regarding the start of the parking session to the location device 1104 and to the user's mobile device 1102. The notifications may include attributes associated with the legal parking zone such as cost per unit of time to park, the start of the parking session, the maximum time parking is permitted in the legal parking zone. In some embodiments, the user can prepay for a parking session. In other embodiments, payment is not made until the user terminates the parking session, the location device leaves the legal parking zone, the maximum parking time has been reached, etc. In some embodiments, the parking session is a pay-as-you-go model such that the user only pays for the time the location device 1104 (and vehicle) are in the legal parking zone. It should be appreciated that such a system mitigates the need to guess how much parking time is required, mitigates the need to prepay for more parking time than is needed, and reduces the amount of time a user must spend attending to payment (running back to feed a meter or adding more time through an mobile phone app). At block 1128, the server also logs the parking session and start of the parking session associated with the location device 1104.

In one embodiment, when the location device 1104 detects a driving event (e.g., MEMS module in the location device 1104 detects motion greater than a predetermined amount or the GNSS module in the location device 1104 detects a speed greater than a predetermined amount), the location device 1104 determines that the parking session should be terminated as illustrated in block 1130. Other events may include the user pressing a button on the location device 1104 to terminate the parking session. At block 1132, the location device 1104 transmits a request to end the parking session to server 1106. In some embodiments (not shown) the server 1106 initiates the parking session termination due to factors such as the maximum legal parking time being reached, a prepaid parking session expired, or a separate parking session termination request was received from the mobile device 1102. In some embodiments, the server 1106 may also initiate the parking session termination where the location device 1104 runs out of power during a parking session or some other suitable reason the server 1106 is configured to terminate the parking session for prior to receiving a termination request from the location device 1104. In some embodiments, if the user manually tries to stop the parking session through the mobile device 1102 and the location device 1104 does not respond, the server 1106 may terminate the parking session and trigger the payment process with payment process server 1110 without further communicating with the location device 1104 because the location device 1104 is unreachable (e.g., the location device 1104 may be turned off, run out of batteries, an issue occurred with cellular network coverage, etc.).

Returning to block 1134, the server 1106 receives the parking session termination request from location device 1104 and ends the parking session. In one embodiment, the server 1106 stores a log of all or some of the parking session, including the end time in database 1108. If the legal parking zone required payment (and the user did not prepay), the server 1106 calculates the required payment based on the time and parking zone fee. The server 1106 transmits the parking session charge to payment process server 1110. Payment process server 1110 executes a charge (e.g., charging a credit card of the user or debiting the user's bank account) for the parking session for location device 1104. Payment process server 1110 then sends payment confirmation back to server 1106 as shown in block 1138. As noted above, in some embodiments, parking in some legal parking zones may not require payment, thus the transaction with payment processor 1110 may not be required.

In some embodiments, server 1106 may then send a message to location device 1104 and mobile device 1102 confirming the end of the parking session as illustrated in block 1140. In some embodiments, server 1106 may also send log information regarding the parking session and a receipt for any charges made for the parking session as shown in block 1140.

In one embodiment, location device 1104 receives the parking session termination message at block 1142 and alerts the user in any suitable manner. In one embodiment, the location device 1104 alerts the user with a change to an LED (e.g., changing the LED to red, or flashings the LED in a particular pattern). Likewise, the user's mobile device 1102, after receiving the parking session termination message at block 1144, will alert the user in any suitable manner. One such display is illustrated in FIG. 13B. The mobile device 1102 may also display the payment receipt information in an application.

The process described above in FIG. 11 may be repeated any number of times when the location device 1104 detects a possible parking event. It should be appreciated that the above described system, in some embodiments, enables a user to park, knows the user is in a legal parking zone, and pays for parking automatically without the user taking any additional affirmative action (however it should be appreciated that in some embodiments, the user may be required to affirmatively accept or authorize a credit card charge, bank debit, or other charge for the parking session).

In one embodiment, where a user has prepaid for a parking session and the user is legally able to park for additional time, the system may automatically purchase additional time for the parking use if the vehicle and location device has not moved at the expiration of the parking session. Alternatively, the geomapping server may automatically alert the user to purchase more time to extend the parking session or start a new parking session.

Figure 12:
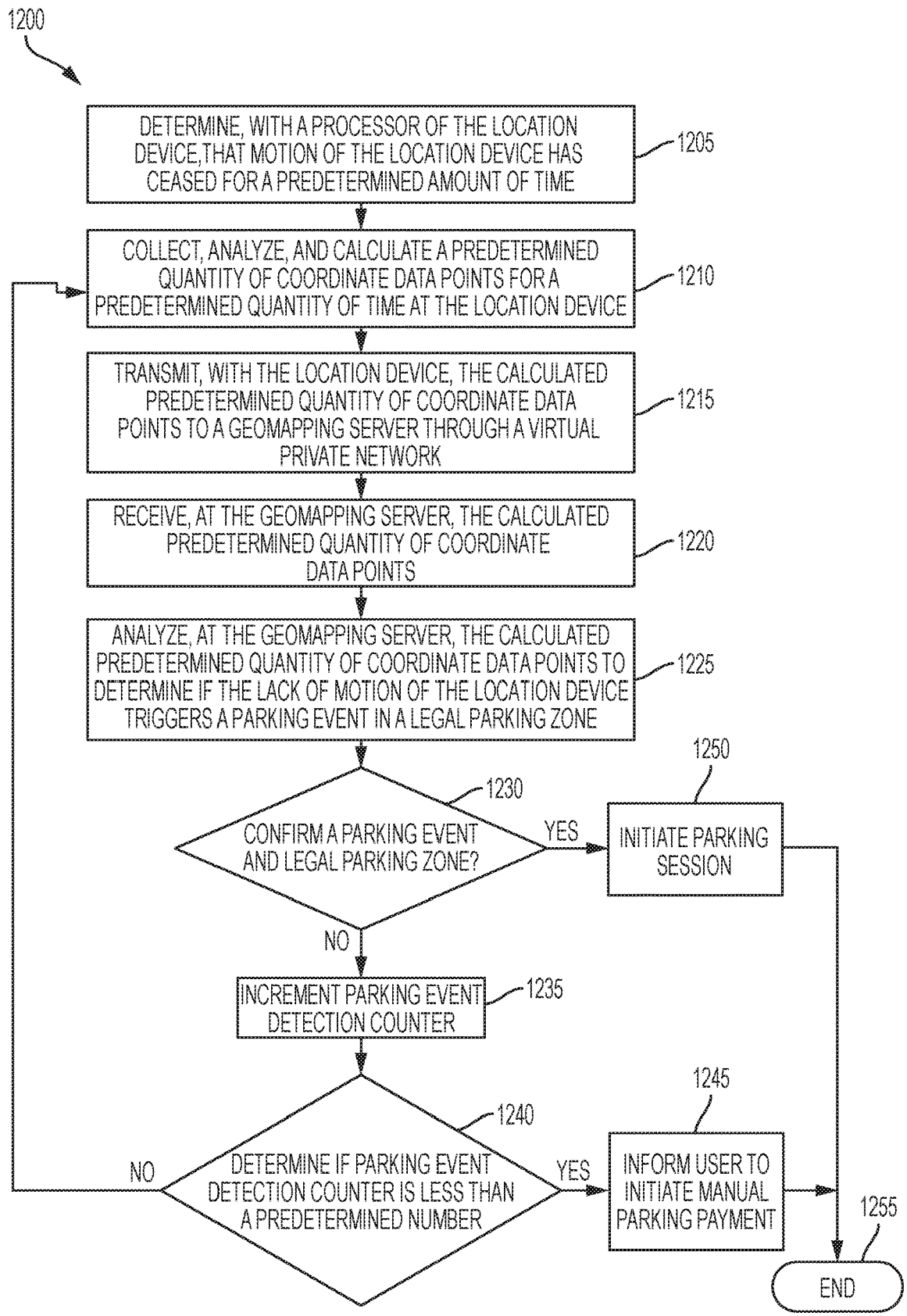
FIG. 12 is a flowchart that illustrates one embodiment of the system and method for automatically detecting a parking event.

FIG. 12 is a flowchart of process 1200 that illustrates one embodiment of the system and method for automatically detecting a possible parking event, such as described in FIG. 11 blocks 1112-1120. At block 1205, the location device determines, with a processor, that motion of the location device has ceased for a predetermined amount of time. At block 1210, the location device collects, analyzes, and calculates a predetermined quantity of coordinate data points for a predetermined quantity of time for the location device. One embodiment of the process of block 1210 was described in connection with FIG. 7 and FIG. 8. At block 1215, the location device transmits the calculated predetermined quantity of coordinate data points to a geomapping server through a virtual private network. The geomapping server receives the calculated predetermined quantity of coordinate data points at block 1220.

At block 1225, the geomapping server analyzes the calculated predetermined quantity of coordinate data points to determine if the lack of motion of the location device triggers a parking event in a legal parking zone. As noted in FIG. 11, geomapping server may compare some or all of the predetermined quantity of coordinate data points against coordinates stored in association with legal parking zones. In one embodiment, if the geomapping server determines that five of 10 coordinate data points are within two meters of a legal parking zone, then the geomapping server knows with high probability that the location device is in a legal parking zone. In some embodiments, the geomapping server compares the calculated predetermined quantity of coordinate data points (including a direction the location device was traveling in some embodiments) to stored road alignment data such as the coordinates of the centerline of a road and the coordinates of the curb edge of the road as part of the analysis. The high accuracy of the calculated predetermined quantity of coordinate data points enables the server to determine if the location device (and vehicle) is closer to the center line of the road verses closer to the curb (which may indicate that the vehicle is in a traffic jam on a narrow road rather than attempting to park on the narrow road). The road alignment data also enables the geomapping server to discount bad coordinate data, such as if the calculated coordinate data indicates that a vehicle is positioned on a sidewalk or in a building (which may occur due to multipath signal distortion). If an appropriate match exists and other factors have ruled out issues such as a traffic jam on a narrow road, the geomapping server confirms that a parking event occurred and the parking event is in a legal parking zone at block 1230. The location device and geomapping server may automatically initiate a parking session at block 1250 as discussed in FIG. 11 or permit a user of the location device to manually start a parking session with the location device (e.g., pressing a button) or with a software application on the user's mobile device (executing a start parking session). Then process 1200 ends.

On the other hand, if an appropriate coordinate match does not exist, the geomapping server transmits a message to the location device indicating that a parking event did not occur or that the parking event is not in a legal parking zone at block 1230. In some embodiments, the coordinates provided by the location device may have been corrupted in a variety of different ways as noted above. In one embodiment, the process 1200 includes permitting the location device to obtain and calculate new coordinate data points. In some embodiments, the location device may attempt to confirm the parking event a predetermined quantity of times, such as 3 times. However, any suitable quantity of times can be used. In this way, the location device is given one or more opportunities to obtain fresh set of location data to mitigate the reason for the previously unmatched coordinate data. In one such embodiment, the geomapping server may increment a parking event detection counter at block 1235. If the incremented parking event detection counter is less than a predetermined number at block 1240, then the process returns to block 1210 for the location device to obtain and calculate new coordinates to transmit to the geomapping server. If the incremented parking event detection counter is equal to a predetermined number at block 1240, then the process 1200 moves to block 1245. The geomapping server sends a message to the location device, the user's mobile device, or both to inform the user that either parking at the current location is not permitted or that the user should initiate a manual parking payment process (e.g., feeding a parking meter or paying at a parking kiosk) and the process 1200 ends at block 1255. In some embodiments, the process 1200 may be restarted manually or automatically after a predetermined amount of time for the same zone.

FIGS. 13A, 13B, and 13C illustrate example embodiments of screen shots of a mobile application corresponding to various states of the system (current active session, no active session, and locating a vehicle). The user may choose to install the application on their mobile phone (e.g., mobile device 140) or other portable device capable of wireless data communication; provided however the same or a similar application can also be used without installation of a mobile application on the user's mobile device. In one embodiment, the mobile application communicates parking-related events to the user received from a geomapping server and allows the user to remotely manage and control their parking account held at the geomapping server. In some embodiments, the mobile application may obtain alerts regarding the location device, such as battery levels, reminders to charge the battery of the location device, operational issues with the location device, etc.

FIG. 13A illustrates one embodiment of a mobile app screen 1300 displayed on a mobile device when a location device in a user's vehicle is in an active parking session. Reference 13A-1 shows the time left until the expiration of the maximum time allowed to park in the zone. Reference 13A-2 shows the cost of parking that has been incurred by the user since the beginning of the parking session in one example embodiment. If the parking is free and the vehicle is parked in a zone known to the system, then Reference 13A-1 may display the time left until the end of the maximum stay in a given parking spot and Reference 13A-2 may reflect a $0 cost incurred in one embodiment. For example, some U.S. cities have on-street parking zones where parking is only allowed at given time periods and for a maximum hourly limit, e.g. 2 hours. So that the user does not have to remember to return to their vehicle in time, the mobile application can be used to set necessary reminders. In some embodiments, the reminders are created automatically for the user when the mobile application (the mobile device) communicates with the geomapping server. The time and duration limits for parking in that zone can be stored in a database (e.g., database 1108 in FIG. 11) associated with the system.

Reference 13A-3 displays a touch-responsive "start" button having the same functionality as a button on the location device that can be used to start a parking session manually in one example embodiment. Reference 13A-4 displays a touch-responsive "stop/cancel" button having the same functionality as a button on the location device that can be used to stop a parking session manually in one embodiment. The mobile application thus provides remote interaction with the system without using the location device's physical interface. However, as noted above, in some embodiments, the mobile device (and the mobile application) may communicate directly with the location device and may control the location device through this channel of communication and also access the parking and payment system through the location device.

FIG. 13B shows another embodiment of a screen 1310 displayed by the mobile application when the location device and vehicle are not parked in any legal parking zone or any legal parking zone that requires access to the parking and payment system. Accordingly, reference 13A-1 does not display any time remaining and reference 13A-2 displays "OFF" because no cost accrual meter is running.

FIG. 13C illustrates a built-in map interface screen 1320 in one embodiment that can be used by the users of the parking and payment system to locate their parked vehicle and reach it expeditiously by following the supplied routing directions 13A-5 (if needed). The map interface can be used in other embodiments to communicate to the user the information about legal parking zones and guide the users to the zones most relevant to their destination. In a further embodiment, the information included on the map interface includes hourly limit and rates for legal parking zones.

In another embodiment, the map interface retrieves spot availability information in real (or near real) time from the parking and payment system and highlights the locations of empty parking spaces to assist the user in rapidly locating a parking spot. In one embodiment, the screen 1320 may enable the user to select a button to obtain the closest parking, prices of the parking spots, and space availability. In some embodiments, when many location devices are in use, the geomapping server tracks what legal parking zones are occupied with a location device and what legal parking zones are not occupied with location devices.

In an alternative embodiment, the geomapping server tracks and stores, in real time or near real time, currently occupied spaces that are being vacated by vehicles using the location device (e.g., location devices that have very recently ended a parking session and are moving). When a user is searching for a parking space (also referred to herein as a legal parking space) within a legal parking zone that is nearby the user's current location, the geomapping server can send such a user the recently vacated parking spaces known to the geomapping server in some embodiments. The geomapping server may send such information to a mobile device of the user (so that the user can obtain a map and directions to the recently vacated spaces). In some embodiments, the determination of recently vacated parking spaces may be based on a predetermined period of time. For example, a recently vacated legal parking space within a legal parking zone may comprise a legal parking space that was vacated in the last 2-4 minutes. This predetermined number may change depending on the jurisdiction, the time of day, or other suitable factors (to adjust for very dense urban areas where legal parking spaces are in such high demand that even 60 seconds may make the information stale and incorrect). It should therefore be appreciated that one benefit to the location devices communicating with the geomapping server to end parking sessions is that the geomapping server will have real time or near real time data on availability of legal parking spaces within legal parking zones. As the number of location devices increase in a given geographic area, the usable quantity of real time or near real time parking data will likewise increase.

Figure 14A:
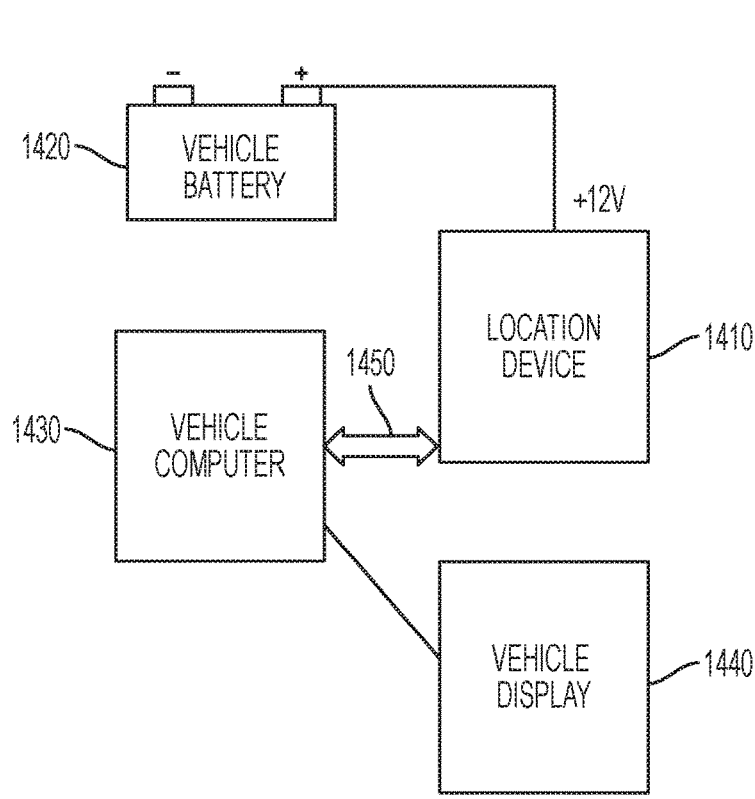
FIGS. 14A and 14B illustrate block schematic diagrams showing example embodiments where components of a location device are integrated into or connected to a vehicle's on-board electronic system.
Figure 14B:
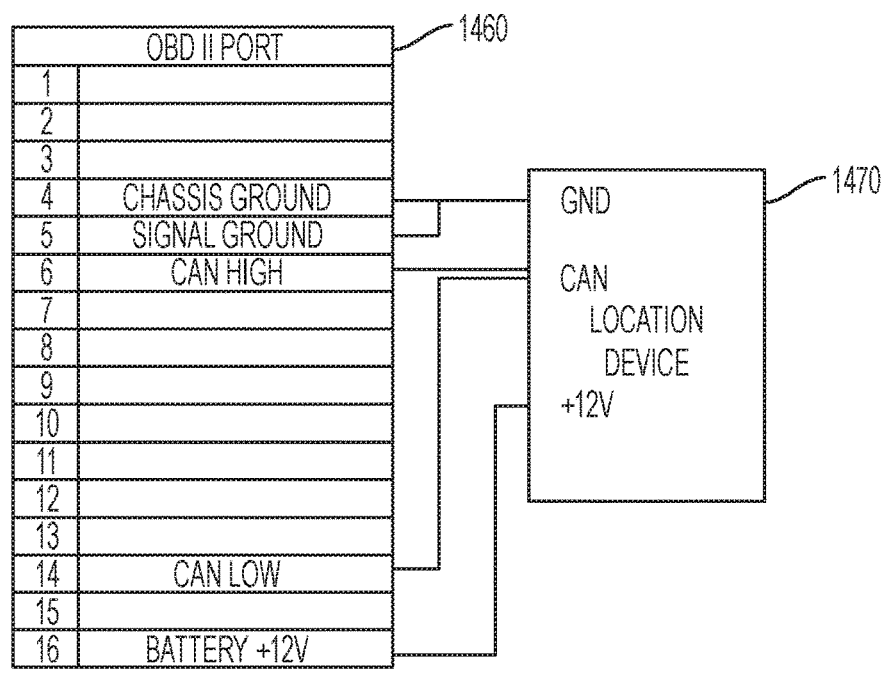

FIGS. 14A and 14B illustrate an example embodiment in which the location device 1410 (which corresponds to location device 10) is integrated into an on-board electronic system of a vehicle 1400 (e.g., vehicle 20). The vehicle computer 1430 can be connected to the location device 1410 via an existing bus link, such as a controller area network (CAN) interface (1450). In one embodiment, the vehicle computer 1430 controls a vehicle display 1440 and can communicate parking-related messages to the user through the vehicle display 1440 and audio system (not shown). The vehicle battery 1420 is used as a power supply in the example embodiment. FIG. 14B illustrates an embodiment in which the vehicle computer 1430 integration is implemented using a standard OBD II (On-board diagnostics) port in the vehicle 1400. The exact integration schema for such an integration depends on the vehicle manufacturer and specific features of the vehicle. The integration illustrated in FIG. 14B is merely an example and other forms of integration may be required. In one embodiment, the CAN bus high and low can be used for the link, the signal and chassis ground can be used for ground together, and +12V supply can be used to power the location device 1470 (which may correspond to location device 10).

In other embodiments, the location device is not integrated in its entirety into the vehicle on-board electronic system. For example, built-in communications systems are present in certain vehicle models and include a wireless communication interface that can be adapted to establish a link between the location device and a geomapping server. In such instances only certain components of the location device, such as the high accuracy geolocation positioning system and certain algorithms (whether implemented in hardware or software), will need to be additionally integrated into the vehicle system.

In one embodiment, the location device can be configured with an alpha-numeric display that can provide the user with useful information and also aids parking enforcement agents enforce parking laws. In one embodiment, the location device has an electronic display to communicate messages to the user and the parking enforcement agents, such as the time of expiration of a current parking session, battery level of the location device, or reminders to charge the location device if it has a low battery level. The user can choose to pay attention to such messages on the display screen and follow them to make sure the system works properly. If the location device is placed in a windshield of the user's vehicle and can be easily seen from outside of the vehicle, parking enforcement agents can use the information from the display to establish whether the vehicle is legally parked and that payment will be processed for the vehicle to stay in the parking zone. For example, a message to parking enforcement may read "EXPIRES AT 1:23 PM", which, if the current time is, for example, 1:11 PM, the message tells the enforcement agent that the vehicle has more time to stay legally in the parking spot.

In some embodiments, an LED light on the location device can be used in place of the display screen or as an additional indicator of active parking sessions and other messages, such as error messages, to be communicated to the user and parking enforcement agents. For example, the location device can illuminate the LED light to a solid green (not flashing) when the parking session is active. In another example, location device can cause the LED light to flash or blink if an error has occurred or if a parking session has not been started.

In another embodiment, the location device can be fitted with a speaker to facilitate communication with the user by providing additional messages in an audio format. For example, when the user arrives in a legal parking zone and the location device does not move for a preset time (e.g., 30 seconds, 1 minute, some other suitable amount of time), the location device may attempt to register a parking event and announces by the speaker, the information retrieved from the geomapping server, such as the hourly limit and rate for a legal parking zone. Such a message may say: "You have successfully parked your vehicle. You can stay here for two hours until 1:23 PM and will pay $2 per hour," in an example embodiment.

In one embodiment, the location device can be configured to communicate with a parking enforcement device. For example, in an embodiment where the location device includes a low energy wireless communication system, the location device can receive requests for information from the parking enforcement device also configured with a compatible low energy wireless communication system. The location device can provide information about an active parking session for the location device. Alternatively, where the location device does not have an active parking session, the location device can provide its identification information to the parking enforcement device so that the parking enforcement agent can generate a ticket based on the account information of the location device. In this manner, a parking enforcement agent can quickly walk by or drive by vehicles with location devices and automatically know which vehicles are legally parked. In some embodiments, the parking enforcement agent can send an invoice for a parking violation to the geomapping server for processing. In this manner, the geomapping server can alert the user of the parking violation and provide the user with a ticket. In some embodiments, the geomapping server enables the user to pay for the ticket through the parking and payment system. The user can authorize the payment using the mobile device application or by pressing a button on the location device to authorize the payment. In some embodiments, when a parking enforcement agent has generated a ticket associated with one location device and sent the information to the geomapping server, the geomapping server may send alerts to users of other nearby (e.g., within a 3 block radius, or other suitable radius) location devices that are not in legal parking zones (or have inactive parking sessions) to move their vehicles to legal parking zones or to activate a parking session.

In another embodiment, a user with a location device may be supplied with a unique barcode, QR code, or other machine readable code that is associated with the location device or with the user's account at the geomapping server. The machine readable code can be placed in a visible area of the user's vehicle while the location device remains hidden in the vehicle. When a parking enforcement agent scans the machine readable code, a parking enforcement device can send a request to a geomapping server for information associated with the machine readable code. If the location device has activated a parking session in a legal parking zone, the queried geomapping server will respond with a message to the parking enforcement device that the vehicle is legally parked. The geomapping server may provide other useful information such as when the parking session expires and whether additional parking time can be purchased. The geomapping server may also have other information about the vehicle (e.g., how many tickets are associated with the vehicle, whether any outstanding law enforcement flags are associated with the vehicle).

In some embodiments, the geomapping server collects crowdsourced data from users to update its database of legal parking zones. In one embodiment, the user may select a function on the user's mobile device which sends a request to a geomapping server to obtain coordinates of the user's location device as being in a new legal parking zone. The geomapping server may send a request for the location device to calculate its current coordinates and send such coordinates back to the geomapping server for review as a potentially new legal parking zone. In some embodiments, the geomapping server may send a request to a local or state government server for confirmation that such coordinates are associated with a new legal parking zone. If confirmation is received from a government server, then the geomapping server may update its database to reflect that such coordinates are a new legal parking zone for future parking sessions. In some embodiments, a button on the location device may be associated with informing the geomapping server that a current position of the location device is associated with a new legal parking zone.

In some embodiments, if the geomapping server receives a plurality of requests from different users that a particular set of calculated coordinate data is associated with a new legal parking zone, the geomapping server may automatically add such calculated coordinate data to its database as a new legal parking zone for future parking sessions. The minimum quantity of requests may be five or more requests; provided however, that any suitable number of requests may be used as the threshold to add the calculated coordinate data to the geomapping server's database of legal parking zones. In some embodiments, the user may provide additional information to the geomapping server regarding the new legal parking zone, such as maximum parking times, costs per time in the new legal parking zone. In some embodiments, this additional information is added to the database when a predetermined amount of users provide the same information about the new legal parking zone. In some embodiments, the user may provide such information through the application on the user's mobile device.

Embodiments described herein may be implemented in hardware, firmware, software, or any combination thereof. Embodiments of the disclosure herein may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in handheld computers, PDAs, smart phones, and other portable devices; magnetic disk storage media; optical storage media; USB drives and other flash memory devices; Internet cloud storage, and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Although illustrative embodiments have been described herein in detail, it should be noted and understood that the descriptions and drawings have been provided for purposes of illustration only and that other variations both in form and detail can be added thereto without departing from the spirit and scope of the disclosure. The terms and expressions in this disclosure have been used as terms of description and not terms of limitation. Thus, the breadth and scope of the present disclosure should not be limited by any of the above-described embodiments, but should be defined only in accordance with the claims and their equivalents. The terms and expressions herein should not be interpreted to exclude any equivalents of features shown and described, or portions thereof. Moreover, various forms of the process flows shown above may be used, with blocks re-ordered, added, or removed. Accordingly, other embodiments are within the scope of the following claims.

We claim:

1. A mobile location system comprising:
   a global navigation satellite systems (GNSS) processor;
   a location processor; and
   a memory device that stores a plurality of instructions, which when executed by the location processor, causes the location processor to be configured to:
   upon a detection of a first predetermined event:
   receive a plurality of GNSS data streams from the GNSS processor;
   receive a plurality of vehicle motion data streams from a processor that captures vehicle motion data;
   calculate, with the location processor, coordinate data streams using the received plurality of GNSS data streams and the plurality of vehicle motion data streams;
   transmit, to a geomapping server, the calculated coordinate data streams, wherein the calculated coordinate data streams are based on the plurality of GNSS data streams and the plurality of vehicle motion data streams;
   determine that at least one of the transmitted plurality of calculated coordinate data streams is associated with a legal parking zone;
   based on the determination that the at least one of the transmitted plurality of calculated coordinate data streams is associated with a legal parking zone:
     receive, from the geomapping server, a legal parking zone message that at least one of the plurality of calculated coordinate data streams is associated with the legal parking zone; and
     cause a parking session to be initiated, and
   transmit, to the geomapping server, a parking session end message to end the parking session upon detection of a second predetermined event, wherein the detection of the second predetermined event comprises detecting that the mobile location system is moving faster than a predetermined speed.

2. The mobile location system of claim 1, wherein the detection of the first predetermined event comprises detecting that the mobile location system is moving less than a predetermined speed.

3. The mobile location system of claim 1, wherein the location processor further receives a timing pulse.

4. The mobile location system of claim 3, wherein the location processor further synchronizes the plurality of GNSS data streams and the plurality of vehicle motion data streams in accordance with the timing pulse.

5. The mobile location system of claim 1, wherein causing the parking session to be initiated comprises transmitting a request to the geomapping server to initiate the parking session.

6. The mobile location system of claim 5, wherein the transmitted request to the geomapping server to initiate the parking session is automatic, without user input.

7. The mobile location system of claim 1, wherein the GNSS processor collects a predetermined quantity of location data points for a predetermined quantity of time.

8. The mobile location system of claim 1, wherein if the transmitted plurality of data streams are not associated with a legal parking zone, receive, from the geomapping server, a retry message.

9. The mobile location system of claim 8, wherein upon receiving the retry message, the location processor further:
   receives a third plurality of data streams from the GNSS processor; and
   transmits, to the geomapping server, additional calculated coordinate data streams based on the third plurality of data streams.

10. The mobile location system of claim 8, wherein if a predetermined number of retry messages are received from the geomapping server within a predetermined time period, a message received from the geomapping server causes the location processor to alert a user that the parking session cannot be initiated.

11. A geomapping server comprising:
    a processor; and
    a memory device that stores a plurality of instructions, which when executed by the processor, causes the processor to be configured to:
    receive, from a location device, a plurality of calculated coordinate data streams that are based on a plurality of global navigation satellite systems (GNSS) data streams and a plurality of vehicle motion data streams;
    compare the received plurality of calculated coordinate data streams with a stored plurality of coordinates;
    determine that one or more of the received plurality of calculated coordinate data streams matches with a legal parking zone;
    transmit, to the location device, a legal parking zone message confirming that one or more of the received plurality of calculated coordinate data streams is associated with the legal parking zone based on the determined match;
    receive, from the location device, a parking session initiation message to initiate a parking session;
    start a parking session associated with the location device; and
    receive, from the location device, a parking session end message to terminate the parking session.

12. The geomapping server of claim 11, wherein the processor further:
    transmits, to a payment processing server, a parking session charge associated with the terminated parking session;
    receive, from the payment processing server, a payment confirmation message; and
    transmit, to a mobile user device, a parking session end confirmation message that further comprises a payment receipt.

13. The geomapping server of claim 12, wherein the processor further:
- stores real time parking session information associated with a plurality of different location devices;
- receives, from a mobile user device, a request for real time parking space availability located near a particular coordinate;
- evaluates a plurality of legal parking zones near the particular coordinate to determine if any of the plurality of different location devices vacated one of the plurality of legal parking zones within a predetermined period of time; and
- if one of the plurality of different location devices vacated one of the plurality of legal parking zones within the predetermined period of time, transmit a parking coordinate associated with the one of the plurality of legal parking zones to the mobile user device.

14. The geomapping server of claim 12, wherein the processor further:
- receives, from a plurality of different mobile user devices, information updates regarding a plurality of legal parking zones; and
- transmits, to the location device, a legal parking zone message confirming that one or more of the received plurality of calculated coordinate data streams is associated with the legal parking zone based on the information updates regarding the plurality of legal parking zones.

15. The geomapping server of claim 11, wherein if the match is not determined, the processor further receives additional pluralities of calculated coordinate data streams a predetermined number of times.

16. A location system comprising:
- a global navigation satellite systems (GNSS) processor;
- a location processor; and
- a memory device that stores a plurality of instructions, which when executed by the location processor, causes the location processor to be configured to:
- upon a detection of a first predetermined event:
- receive a plurality of GNSS data streams from the GNSS processor;
- receive a plurality of vehicle motion data streams;
- convert the plurality of GNSS data streams and the plurality of vehicle motion data streams into a plurality of coordinate data streams;
- transmit, to a geomapping server, the plurality of coordinate data streams, where the coordinate data streams are based on the plurality of GNSS data streams and the plurality of vehicle motion data streams;
- determine that at least one of the transmitted plurality of coordinate data streams is associated with a vehicle use event;
- based on the determination that the at least one of the transmitted plurality of coordinate data streams is associated with the vehicle use event:
- initiate a vehicle use event transaction, and
- transmit, to the geomapping server, a vehicle use event end message to end the vehicle use event transaction upon detection of a second predetermined event, wherein the detection of the second predetermined event comprises detecting that the location system is moving faster than a predetermined speed.

17. The location system of claim 16, wherein the vehicle use event transaction comprises causing a payment to be made.

18. The location system of claim 16, wherein the vehicle use event transaction comprises causing a location database, which stores the location data of a plurality of vehicles, to be updated with location data of the location system.

* * * * *